(12) United States Patent
Nanri et al.

(10) Patent No.: US 7,857,397 B2
(45) Date of Patent: Dec. 28, 2010

(54) BRAKING SYSTEM

(75) Inventors: Takehiko Nanri, Wako (JP); Kazuya Takenouchi, Wako (JP); Makoto Toda, Wako (JP); Kazuhiko Tani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/566,657

(22) Filed: Sep. 24, 2009

(65) Prior Publication Data
US 2010/0078990 A1    Apr. 1, 2010

(30) Foreign Application Priority Data
Sep. 29, 2008   (JP)   .............................. 2008-251704

(51) Int. Cl.
*B60T 13/18*  (2006.01)
(52) U.S. Cl. ......................................... 303/11; 188/352
(58) Field of Classification Search ................ 188/152, 188/344, 352; 303/11; 141/59, 98, 302
See application file for complete search history.

(56) References Cited

U.S. PATENT DOCUMENTS

2008/0011566 A1* 1/2008 Campbell et al. ........... 188/352
2008/0018172 A1* 1/2008 Bachle ......................... 303/11
2009/0032136 A1* 2/2009 Petty ............................ 141/59
2009/0032347 A1* 2/2009 Murphy et al. .............. 188/352

FOREIGN PATENT DOCUMENTS

JP    2008-006850    1/2008

* cited by examiner

*Primary Examiner*—Christopher P Schwartz
(74) *Attorney, Agent, or Firm*—Ditthavong Mori & Steiner, P.C.

(57) ABSTRACT

A braking system includes first and second electromagnetic opening valves and a bleeding mode setting unit. The first electromagnetic opening and closing valve is provided to a first brake fluid channel to communicate or block a first fluid pressure from a master cylinder to a wheel brake. The second electromagnetic opening and closing valve is provided to a second brake fluid channel to communicate or block a second fluid pressure from a power unit to the wheel brake. The bleeding mode setting unit is provided to set a bleeding mode in which each of the first and second electromagnetic opening and closing valves is opened and closed in order to perform an air-bleeding from each of the first and second brake fluid channels. The determining unit is provided to determine whether or not the bleeding mode setting unit is allowed to set the bleeding mode.

14 Claims, 15 Drawing Sheets

FIG.3

FRONT BLEEDING PROCEDURE

| STEP | STATE | MAIN SWITCH | BRAKING OPERATION | CONTENTS OF OPERATION | VALVE I | VALVE II | VALVE III | MOTOR |
|---|---|---|---|---|---|---|---|---|
| 1 | PREPARATION | OFF | INPUT TO REAR AND FRONT | PERFORM BLEEDING FROM BLEEDING HOLES OF FRONT AND REAR BRAKE CALIPERS | OPEN | CLOSE | CLOSE | — |
| 2 | | ← | — | CONNECT CHECK COUPLER TO PREDETERMINED COUPLER | ← | ← | ← | — |
| 3 | INITIAL SETTING | ON | INPUT TO REAR | TURN MAIN SWITCH ON WHILE INPUTTING TO REAR BRAKE WITH VEHICLE STOPPED (PREPARING FOR ACTIVATION OF BLEEDING MODE) | ← | ← | ← | — |
| 4 | | ← | INPUT TO REAR AND RELEASE | RELEASE REAR BRAKE AFTER HAVING ELAPSED PREDETERMINED PERIOD WHILE CONTINUOUSLY INPUTTING TO REAR BRAKE (PREPARING FOR ACTIVATION OF BLEEDING MODE) | ← | ← | ← | — |
| 5 | | ← | INPUT TO REAR | INPUT TO REAR BRAKE (PREPARING FOR ACTIVATION OF BLEEDING MODE) | ← | ← | ← | — |
| 6 | | ← | — | RELEASE REAR BRAKE (PREPARING FOR ACTIVATION OF BLEEDING MODE) | ← | ← | ← | — |
| 7 | BLEEDING MODE | ← | INPUT TO FRONT | INPUT TO FRONT BRAKE, THEN VALVES I TO III OPEN, AND THEN PERFORM BLEEDING FROM BLEEDING HOLES H1 TO H3 RESPECTIVELY | OPEN | OPEN | OPEN | — |
| 8 | | ← | INPUT TO REAR AND FRONT | INPUT TO REAR BRAKE, THEN OPENING AND CLOSING STATES OF VALVES ARE SWITCHED, AND THEN INPUT TO FRONT BRAKE, AND MAINTAIN STATE IN WHICH FLUID PRESSURE IS APPLIED TO STROKE SIMULATOR | CLOSE | CLOSE | ← | — |
| 9 | | ← | INPUT TO REAR | INPUT TO REAR BRAKE, THEN OPENING AND CLOSING STATES OF VALVES ARE SWITCHED, AND THEN RELEASE FRONT BRAKE, AND MAINTAIN STATE IN WHICH BLEEDING HOLE OF FRONT BRAKE CALIPER IS OPENED | ← | ← | CLOSE | — |
| 10 | | ← | INPUT TO REAR | INPUT TO REAR BRAKE, THEN POWER UNIT IS OPERATED FOR A CERTAIN PERIOD OF TIME, AND FLUID PRESSURE IN CYLINDER BODY IS INCREASED | ← | ← | ← | OPERATED |
| 11 | | ← | — | WHEN OPERATION OF POWER UNIT IS STOPPED, SINCE OPENING AND CLOSING STATES OF VALVES ARE SWITCHED, PERFORM BLEEDING OF FRONT BRAKE CALIPER | OPEN | OPEN | ← | — |
| 12 | | ← | INPUT TO REAR | INPUT TO REAR BRAKE, THEN OPENING AND CLOSING STATES OF VALVES ARE SWITCHED, AND THEN POWER UNIT IS OPERATED, SO THAT FLUID PRESSURE IN CYLINDER BODY IS LOWERED | OPEN | OPEN | OPEN | OPERATED |
| 13 | END | OFF | — | WHEN INDICATOR FLASHES, TURN MAIN SWITCH OFF | ← | CLOSE | CLOSE | — |

FIG.4

REAR BLEEDING PROCEDURE

| STEP | STATE | MAIN SWITCH | BRAKING OPERATION | CONTENTS OF OPERATION | VALVE I | VALVE II | VALVE III | MOTOR |
|---|---|---|---|---|---|---|---|---|
| 21 | PREPARATION | OFF | INPUT TO REAR AND FRONT | PERFORM BLEEDING FROM BLEEDING HOLES OF FRONT AND REAR BRAKE CALIPERS | OPEN | CLOSE | CLOSE | — |
| 22 | | ↑ | — | CONNECT CHECK COUPLER TO PREDETERMINED COUPLER | ↑ | ↑ | ↑ | — |
| 23 | INITIAL SETTING | ON | INPUT TO REAR | TURN MAIN SWITCH ON WHILE INPUTTING TO REAR BRAKE WITH VEHICLE STOPPED (PREPARING FOR ACTIVATION OF BLEEDING MODE) | ↑ | ↑ | ↑ | — |
| 24 | | ↑ | INPUT TO REAR AND RELEASE | RELEASE REAR BRAKE AFTER HAVING ELAPSED PREDETERMINED PERIOD WHILE CONTINUOUSLY INPUTTING TO REAR BRAKE (PREPARING FOR ACTIVATION OF BLEEDING MODE) | ↑ | ↑ | ↑ | — |
| 25 | | ↑ | INPUT TO REAR | INPUT TO REAR BRAKE (PREPARING FOR ACTIVATION OF BLEEDING MODE) | ↑ | ↑ | ↑ | — |
| 26 | | ↑ | — | RELEASE REAR BRAKE (PREPARING FOR ACTIVATION OF BLEEDING MODE) | ↑ | ↑ | ↑ | — |
| 27 | | ↑ | INPUT TO REAR | INPUT TO REAR BRAKE, THEN VALVES I TO III OPEN, AND THEN PERFORM BLEEDING FROM BLEEDING HOLES H1 TO H3 RESPECTIVELY | OPEN | OPEN | OPEN | — |
| 28 | | ↑ | INPUT TO REAR AND FRONT | INPUT TO FRONT BRAKE, THEN OPENING AND CLOSING STATES OF VALVES ARE SWITCHED, AND THEN INPUT TO REAR BRAKE, AND MAINTAIN STATE IN WHICH FLUID PRESSURE IS APPLIED TO STROKE SIMULATOR | CLOSE | CLOSE | ↑ | — |
| 29 | BLEEDING MODE | ↑ | INPUT TO FRONT | INPUT TO FRONT BRAKE, THEN OPENING AND CLOSING STATES OF VALVES ARE SWITCHED, AND THEN RELEASE REAR BRAKE, AND MAINTAIN STATE IN WHICH BLEEDING HOLE OF REAR BRAKE CALIPER IS OPENED | ↑ | ↑ | CLOSE | — |
| 30 | | ↑ | INPUT TO FRONT | INPUT TO FRONT BRAKE, THEN POWER UNIT IS OPERATED FOR A CERTAIN PERIOD OF TIME, AND FLUID PRESSURE IN CYLINDER BODY IS INCREASED | ↑ | ↑ | ↑ | OPERATED |
| 31 | | ↑ | — | WHEN OPERATION OF POWER UNIT IS STOPPED, SINCE OPENING AND CLOSING STATES OF VALVES ARE SWITCHED, PERFORM BLEEDING FROM BLEEDING HOLES OF REAR BRAKE CALIPER | OPEN | OPEN | ↑ | — |
| 32 | | ↑ | INPUT TO FRONT | INPUT TO FRONT BRAKE, THEN OPENING AND CLOSING STATES OF VALVES ARE SWITCHED, AND THEN POWER UNIT IS OPERATED, SO THAT FLUID PRESSURE IN CYLINDER BODY IS LOWERED | OPEN | OPEN | OPEN | OPERATED |
| 33 | END | OFF | — | WHEN INDICATOR FLASHES, TURN MAIN SWITCH OFF | ↑ | CLOSE | CLOSE | — |

[NORMAL MODE]

[NORMAL MODE]

[NORMAL MODE]

[BLEEDING MODE] STEP 1

[BLEEDING MODE] STEP 7

[BLEEDING MODE] STEP 8

[BLEEDING MODE] STEP 9

[BLEEDING MODE] STEP 10

[BLEEDING MODE] STEP 11

[BLEEDING MODE] STEP 12

[BLEEDING MODE] STEP 13

BRAKING SYSTEM

CROSS-REFERENCE TO RELATED APPLICATIONS

The present application claims priority under 35 U.S.C. §119 to Japanese Patent Application No. 2008-251704, filed Sep. 29, 2008. The contents of this application are incorporated herein by reference in their entirety.

BACKGROUND OF THE INVENTION

1. Field of the Invention

The present invention relates to a braking system.

2. Discussion of the Background

Some of hydraulic braking devices widely used in vehicles such as motorcycles are configured in such a manner that a brake input side where an operator causes a fluid pressure to be generated in brake fluid by operating a brake operating unit and a brake output side where the fluid pressure acts on wheel braking means are allowed to be brought into communication or out of communication by an electromagnetic opening and closing valve.

As an example, a braking device of so called a "bi-wire" braking device which electrically detects an amount of operation of the brake operating unit, controls a power unit on the basis of a detected value to generate a fluid pressure, and activates the wheel braking means is known. For example, see JP-A-2008-6850.

According to FIG. 1 in JP-A-2008-6850, a fluid pressure circuit 1 as a brake circuit on a front wheel side includes a master cylinder 3 configured to generate the fluid pressure by an operation of a brake operating unit 2 as a brake lever, a brake caliper 4 provided on the front wheel, a fluid pressure modulator 6 configured to generate a fluid pressure by a motor, and a reaction force simulator 9 configured to cause the brake operating unit 2 to generate a pseudo reaction force according to the operation of the brake operating unit 2.

The master cylinder 3 and the brake caliper 4 are brought into communication by a main brake channel 5, and a first electromagnetic opening and closing valve V1 is provided in the main brake channel 5, the master cylinder 3 and the reaction force simulator 9 are brought into communication by a branch channel 8, a second electromagnetic opening and closing valve V2 is provided in the branch channel 8, the fluid pressure modulator 6 and the brake caliper 4 are brought into communication by a supply and exhaust channel 7, and a third electromagnetic opening and closing valve V3 is provided in the supply and exhaust channel 7.

When electricity is not distributed, the first electromagnetic opening and closing valve V1 is opened, and the second electromagnetic opening and closing valve V2 and the third electromagnetic opening and closing valve V3 are closed.

For example, when a bleeding operation to release air in the fluid pressure circuit 1 is performed, as regards the main brake channel 5 from the master cylinder 3 to the brake caliper 4, bleeding from a bleeding hole provided on the brake caliper is possible by causing the master cylinder 3 to generate the fluid pressure by operating the brake operating unit 2 since the first electromagnetic opening and closing valve V1 is opened, but the bleeding cannot be achieved because the second electromagnetic opening and closing valve V2 and the third electromagnetic opening and closing valve V3 provided in the branch channel 8 from the master cylinder 3 to the reaction force simulator 9 or the supply and exhaust channel 7 from the fluid pressure modulator 6 to the brake caliper 4 respectively, are closed.

Therefore, in order to perform the bleeding, a computer which issues an instruction to an ECU which controls the second electromagnetic opening and closing valve V2 and the third electromagnetic opening and closing valve V3 from the outside is needed to distribute electricity to the second electromagnetic opening and closing valve V2 and the third electromagnetic opening and closing valve V3. An operation to connect the computer as such is complicated, and hence a simpler operation is desired.

SUMMARY OF THE INVENTION

According to one aspect of the present invention, a braking system includes a wheel brake, a master cylinder, a first brake fluid channel, a first electromagnetic opening and closing valve, a power unit, a second brake fluid channel, a second electromagnetic opening and closing valve, and an ECU. The wheel brake is configured to provide a braking force to a wheel according to a fluid pressure. The fluid pressure includes a first fluid pressure and a second fluid pressure. The master cylinder is operatively connected to a brake operating unit and is configured to generate the first fluid pressure in conjunction with a braking operation of the brake operating unit. The first brake fluid channel connects the master cylinder and the wheel brake. The first electromagnetic opening and closing valve is provided to the first brake fluid channel to communicate or block the first fluid pressure from the master cylinder to the wheel brake. The power unit is configured to generate the second fluid pressure by an electric actuator. The second brake fluid channel connects the power unit and the wheel brake. The second electromagnetic opening and closing valve is provided to the second brake fluid channel to communicate or block the second fluid pressure from the power unit to the wheel brake. The ECU is configured to control the first electromagnetic opening and closing valve and the second electromagnetic opening and closing valve and includes a bleeding mode setting unit and a determining unit. The bleeding mode setting unit is configured to set a bleeding mode in which each of the first electromagnetic opening and closing valve and the second electromagnetic opening and closing valve is opened and closed in order to perform an air-bleeding from each of the first brake fluid channel and the second brake fluid channel. The determining unit is configured to determine whether or not the bleeding mode setting unit is allowed to set the bleeding mode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a first flowchart showing a flow of the braking system according to the embodiment of the present invention;

FIG. 4 is a second flowchart showing a flow of the braking system according to the embodiment of the present invention;

DESCRIPTION OF THE EMBODIMENTS

Figure 1:
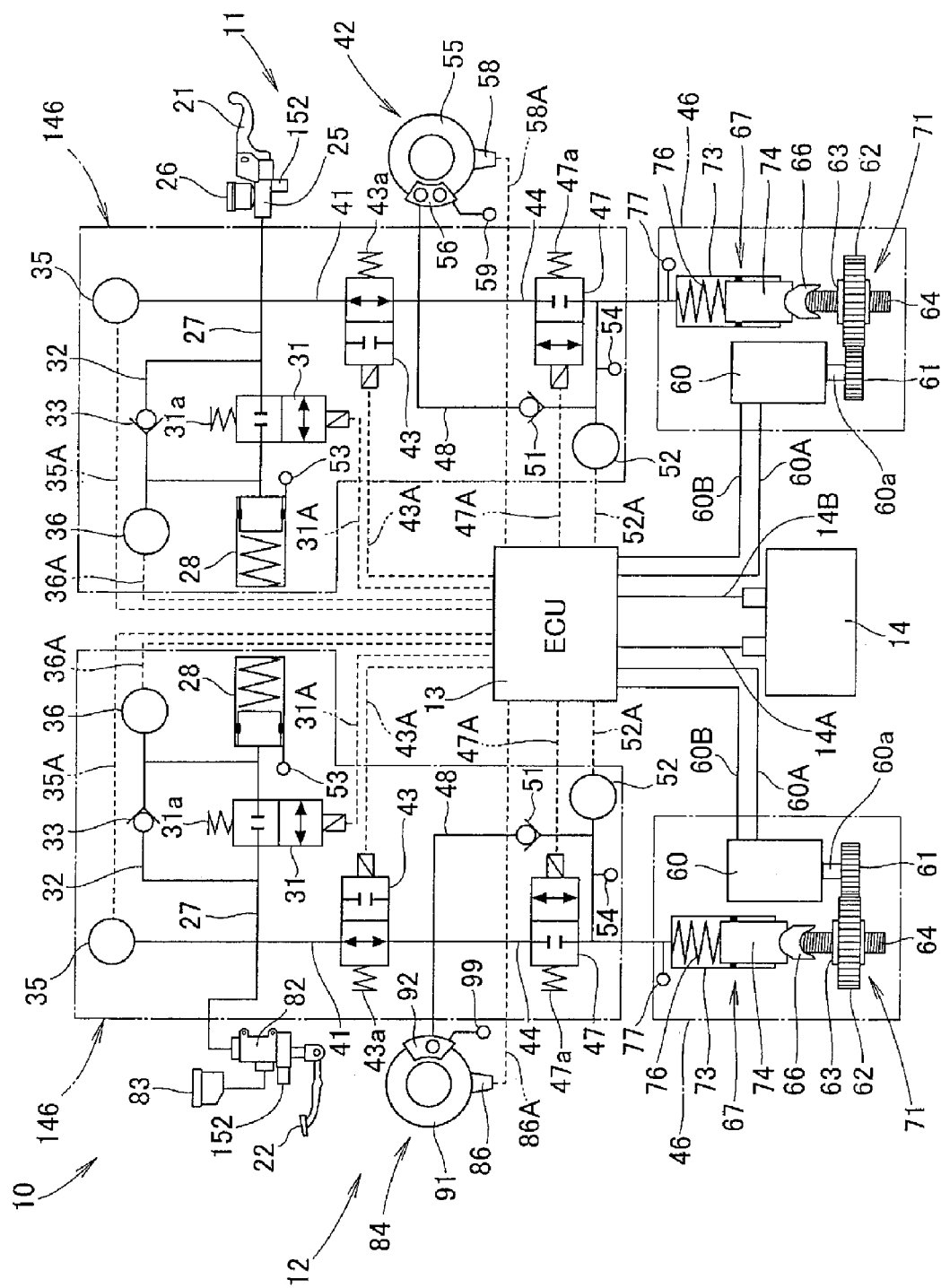
FIG. 1 is a system diagram of a braking system for a vehicle according to an embodiment of the present invention.

Embodiments will now be described with reference to the accompanying drawings, wherein like reference numerals designate corresponding or identical elements throughout the various drawings.

FIG. 1 is a system diagram of a braking system for a vehicle according an embodiment of to the present invention.

A braking system 10 includes a front wheel braking device 11 configured to apply brakes on a front wheel of a motorcycle as a vehicle, a rear wheel braking device 12 configured to apply brakes on a rear wheel of a motorcycle, an ECU (Electronic Control Unit) 13 configured to control opening and closing a plurality of electromagnetic valves provided in brake fluid channels provided in the front wheel braking device 11 and the rear wheel braking device 12 respectively, a battery 14 configured to supply electricity to the front wheel braking device 11, the rear wheel braking device 12, and the ECU 13, and is of a bi-wire system in which amounts of operation of a brake lever 21 provided on the front wheel braking device 11 and a brake pedal 22 provided on the rear wheel braking device 12 are electrically detected, a brake fluid pressure according to the detected amounts is generated to apply brakes on the front wheel and the rear wheel independently or in an interlocking manner.

The front wheel braking device 11 includes the brake lever 21, a front wheel master cylinder 25 connected to the brake lever 21 and configured to generate the brake fluid pressure by operating the brake lever 21, a reservoir tank 26 in which brake fluid which enters and comes out from the front wheel master cylinder 25 is stored, a front wheel disk braking device 42 configured to apply brakes on the front wheel, a brake piping 41 (first brake fluid channel) configured to connect the front wheel master cylinder 25 and the front wheel disk braking device 42, a main path electromagnetic valve 43 (first electromagnetic opening and closing valve) provided at a midsection in the brake piping 41, a brake piping 27 (third brake fluid channel) configured to be branched from the front wheel master cylinder 25 side with respect to the main path electromagnetic valve 43 of the brake piping 41, a stroke simulator 28 connected to the front wheel master cylinder 25 via the brake piping 27, a simulator-side electromagnetic valve 31 (third electromagnetic opening and closing valve) provided at a midsection of the brake piping 27, a bypass piping 32 provided on the brake piping 27 so as to avoid the simulator-side electromagnetic valve 31, a one-way valve 33 provided at a midsection of the bypass piping 32, a first pressure sensor 35 connected to the front wheel master cylinder 25, a second pressure sensor 36 connected to the bypass piping 32, a power unit 46 connected to the brake piping 41 via a brake piping 44 (second brake fluid channel), a power unit-side electromagnetic valve 47 (second electromagnetic opening and closing valve) provided at a midsection of the brake piping 44, a bypass piping 48 connected to the brake piping 44 so as to avoid the power unit-side electromagnetic valve 47, a one-way valve 51 provided at a midsection of the bypass piping 48, and a third pressure sensor 52 connected to the bypass piping 48. Reference numerals 14A and 14B designate lead lines for connecting the ECU 13 and the battery 14.

The stroke simulator 28 is configured to generate a pseudo reaction force by the brake fluid pressure generated in the front wheel master cylinder 25 according to an amount of operation of the brake lever 21 and provide an operation feeling which is the same as an operation feeling generated on a brake lever of a normal hydraulic braking device other than the bi-wire system such as a play to hands of an operator operating the brake lever 21.

A simulator-side bleeding hole 53 is in communication with a fluid pressure chamber on the fluid pressure supplying side in the stroke simulator 28, and the bleeding hole 53 is closed by a bleeder screw (not shown) normally other than the time of bleeding operation.

The simulator-side electromagnetic valve 31 is a component which is normally closed by a resilient force of a compression coil spring 31a (normally closed type), and is opened against the resilient force of the compression coil spring 31a by receiving a control signal outputted from the ECU 13 via a lead line 31A.

The bypass piping 32 and the one-way valve 33 are configured to release a remaining pressure of the brake fluid generated in the stroke simulator 28 and the one-way valve 33 is a component which allows only a flow of the brake fluid from the stroke simulator 28 side to the front wheel master cylinder 25 side.

The first pressure sensor 35, being provided in the brake piping 41, is a component which detects the pressure in the front wheel master cylinder 25 via the brake piping 41, and is connected to the ECU 13 via a lead line 35A.

The second pressure sensor 36 is a component provided on the stroke simulator 28 side with respect to the simulator-side electromagnetic valve 31 of the brake piping 27 and connected to the brake piping 27 via the bypass piping 32 for detecting the pressure in the stroke simulator 28, and is connected to the ECU 13 via a lead line 36A.

Since the second pressure sensor 36 is provided on the stroke simulator 28 side of the simulator-side electromagnetic valve 31, it is hardly affected by a pressure change on the brake piping 41 side when it is closed.

A resolution of the second pressure sensor 36 measuring the fluid pressure is higher than a resolution of the first pressure sensor 35. In other words, the pressure-resistance performance of the first pressure sensor 35 is higher than the pressure-resistance performance of the second pressure sensor 36.

Detected fluid pressure values of the first pressure sensor 35 and the second pressure sensor 36 are compared for failure diagnosis in the ECU 13.

The front wheel disk braking device 42 includes a brake disk 55 and a brake caliper 56 configured to apply brakes on the brake disk 55, and the brake caliper 56 is connected to the brake piping 41 described above. The reference numeral 58 designates a front wheel velocity sensor for obtaining the wheel velocity of a front wheel by detecting the revolving speed of the brake disk 55, which is connected to the ECU 13 by a lead line 58A.

The brake caliper 56 includes a bleeding hole 59 for bleeding air. The bleeding hole 59 is closed by a bleeder screw (not shown) normally other than the time of bleeding operation.

The main path electromagnetic valve 43 is a component which is normally opened by a resilient force of a compression coil spring 43a (normally opened type), and is closed against the resilient force of the compression coil spring 43a by receiving the control signal outputted from the ECU 13 via a lead line 43A.

The power unit 46 includes an electric motor 60, a first gear 61 mounted on a revolving shaft 60a of the electric motor 60, a second gear 62 configured to engage the first gear 61, a nut member 63 attached integrally to the second gear 62, a screw shaft 64 joined to the nut member 63 by screwing via a plurality of balls (not shown), a power cylinder device 67 pressed against the screw shaft 64 via a pressure member 66, and a power unit side bleeding hole 77 described later. Reference numerals 60A and 60B designate lead lines for connecting the ECU 13 and the electric motor 60 in order to distribute electricity to the electric motor 60.

The nut member 63, the plurality of balls, and the screw shaft 64 constitute a ball screw mechanism 71.

The power cylinder device 67 includes a cylinder body 73, a power piston 74 movably inserted into the cylinder body 73 and having the pressure member 66 pressed against one end thereof, and a compression coil spring 76 arranged between the other end of the power piston 74 and a bottom of the cylinder body 73, and the brake piping 44 is connected to the bottom of the cylinder body 73.

The brake piping 44 in the vicinity of the cylinder body 73 is in communication with the power unit-side bleeding hole 77, and the power unit side bleeding hole 77 is closed by a bleeder screw (not shown) normally other than the time of bleeding operation.

The power unit-side electromagnetic valve 47 is a component which is normally closed by a resilient force of a compression coil spring 47a (normally closed type), and is opened against the resilient force of the compression coil spring 47a by receiving the control signal outputted from the ECU 13 via a lead line 47A.

The bypass piping 48 and the one-way valve 51 are configured to release a remaining pressure of the brake fluid generated in the cylinder body 73 of the power unit 46 and the one-way valve 51 allows only a flow of the brake fluid from the power unit 46 side to the brake caliper 56 side.

A bypass-side bleeding hole 54 is in communication with a midsection of the bypass piping 48, and the bypass-side bleeding hole 54 is closed by a bleeder screw (not shown) normally other than the time of bleeding operation.

The third pressure sensor 52 is a component which detects a fluid pressure in the cylinder body 73, and is connected to the ECU 13 via a lead line 52A.

The ECU 13 controls opening and closing of the main path electromagnetic valve 43, the simulator-side electromagnetic valve 31, and the power unit-side electromagnetic valve 47 and an operation of the electric motor 60 on the basis of pressure signals from the first pressure sensor 35, the second pressure sensor 36, and the third pressure sensor 52 and a front wheel velocity signal from the front wheel velocity sensor 58.

The rear wheel braking device 12 is substantially the same as the front wheel braking device 11 as a basic structure, but is provided with the brake pedal 22 instead of the brake lever 21, a rear wheel master cylinder 82 instead of the front wheel master cylinder 25, a reservoir tank 83 instead of the reservoir tank 26, a rear wheel disk braking device 84 instead of the front wheel disk braking device 42, a rear wheel velocity sensor 86 instead of the front wheel velocity sensor 58, and a lead line 86A, described later, instead of the lead line 58A. Other components of the rear wheel braking device 12 are designated by the same reference numerals as in the front wheel braking device 11.

The rear wheel disk braking device 84 includes a brake disk 91 and a brake caliper 92 configured to apply brakes on the brake disk 91, and the brake caliper 92 is connected to the brake piping 41.

The brake caliper 92 includes a bleeding hole 99 for bleeding air. The bleeding hole 99 is closed by a bleeder screw (not shown) normally other than the time of bleeding operation.

The rear wheel velocity sensor 86 is a component to detect the revolving speed of the brake disk 91, that is, the wheel velocity of the rear wheel, and is connected to the ECU 13 via the lead line 86A.

The front wheel velocity sensor 58 and the rear wheel velocity sensor 86 detect the wheel velocities of the front wheel and the rear wheel, and serves also as a vehicle velocity sensor since it obtains the velocity of the vehicle body by the ECU 13 on the basis of these wheel velocities.

The velocity of the vehicle body is provided with, for example, a predetermined threshold value, and the threshold value is compared with the velocity of the vehicle body obtained from the wheel velocities of the front wheel velocity sensor 58 and the rear wheel velocity sensor 86 by the ECU 13, and the opening and closing of the main path electromagnetic valve 43, the simulator-side electromagnetic valve 31, and the power unit-side electromagnetic valve 47 are controlled by the ECU 13.

Part of the brake piping 41, the main path electromagnetic valve 43, the brake piping 27, the stroke simulator 28, the simulator-side bleeding hole 53, the simulator-side electromagnetic valve 31, the one-way valve 33, the first pressure sensor 35, the second pressure sensor 36, part of the brake piping 44, the power unit-side electromagnetic valve 47, the bypass piping 48, the one-way valve 51, the third pressure sensor 52, and the power unit side bleeding hole 77 are components which constitute a valve unit 146.

Figure 2:
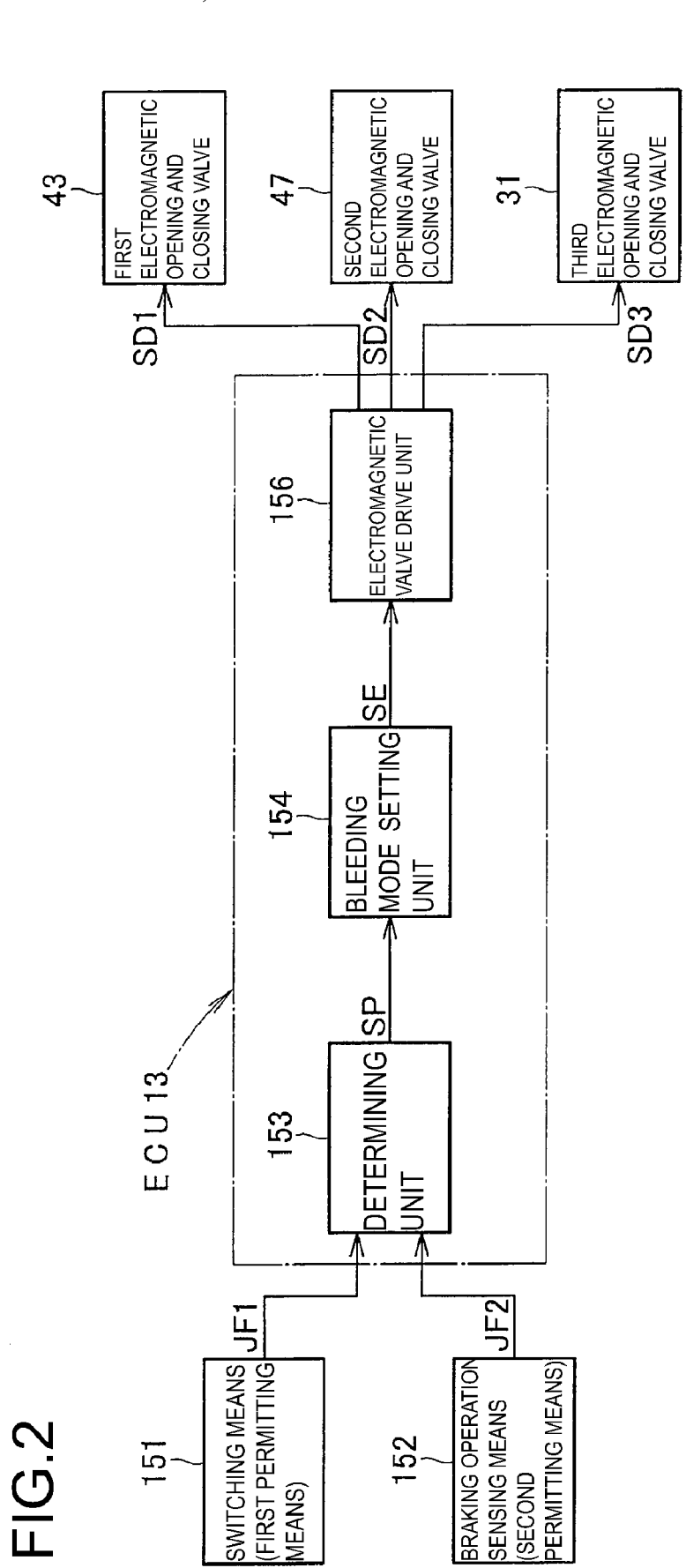
FIG. 2 is a block diagram for explaining an ECU according to the embodiment of the present invention.

FIG. 2 is a block diagram for explaining the ECU in the embodiment of the present invention. When the ECU 13 receives both a first operation complete data JF1 from first permitting means 151 and a second operation complete data JF2 from second permitting means 152, the ECU 13 controls opening and closing of the main path electromagnetic valve (first electromagnetic opening and closing valve) 43, the power unit-side electromagnetic valve (second electromagnetic opening and closing valve) 47, and the simulator-side electromagnetic valve (third electromagnetic opening and closing valve) 31 on the basis of the first and second operation complete data JF1 and JF2.

The switching means 151 as the first permitting means is a contact point at which electricity distribution and non-electricity distribution of a bleeding mode circuit are selected depending on the presence or absence of a connection between a predetermined coupler provided on the motorcycle side (not shown) and a check coupler provided separately from the motorcycle, and the braking operation sensing means 152 as the second permitting means is a sensor for sensing operations of the brake lever 21 (see FIG. 1) and the brake pedal 22 (see FIG. 1), that is, an action to grip the brake lever 21 for an input to the brake lever 21 and an action to press the brake pedal 22 for an input to the brake pedal 22.

The ECU 13 includes a determining unit 153 configured to permit the transfer to a bleeding mode when the operations of the first permitting means 151 and the second permitting means 152 are completed and the first operation complete data JF1 and the second operation complete data JF2 are issued, a bleeding mode setting unit 154 configured to set the bleeding mode upon reception of a permitting signal SP from the determining unit 153, and an electromagnetic valve drive unit 156 configured to supply a first drive signal SD1, a second drive signal SD2, and a third drive signal SD3 respectively to the first electromagnetic opening and closing valve 43, the second electromagnetic opening and closing valve 47, and the third electromagnetic opening and closing valve 31 on the basis of a setting signal SE from the bleeding mode setting unit 154 thereby open and close these valves.

An operation of the braking system 10 described above will be described below.

FIG. 3 is a first flowchart showing a flow of a bleeding procedure of the front braking device in the braking system according to the embodiment of the present invention. In the follow description, steps are designated by ST.

ST1 . . . As a preparation, the bleeding from the front and rear brake calipers 56, 92 is performed. At this time, the inputs to the brake lever 21 and the brake pedal 22 are performed respectively for increasing fluid pressures in a front brake fluid channel and a rear brake fluid channel (see FIG. 1 and FIG. 8).

ST2 . . . As a preparation, the check coupler provided separately from the vehicle body side is connected to the predetermined coupler provided on the vehicle body side, and the contact points are electrically connected to distribute electricity to the bleeding mode circuit.

ST3 . . . As an initial setting, a main switch is turned ON while inputting the rear brake (brake pedal 22) in a state in which the vehicle is stopped. Accordingly, the preparation for the transfer to the bleeding mode is started. The mode is transferred to the bleeding mode from the stopped state only when the main switch is ON.

For example, in a state in which the vehicle is traveling, a normal control, that is, the amount of operation of the brake lever 21 or the brake pedal 22 is electrically detected, and a control to cause the front wheel disk braking device 42 (see FIG. 1) or the rear wheel disk braking device 84 (see FIG. 1) to generate a braking force according to the amount of detection is performed.

In the row of the main switch in FIG. 3, arrows indicate the same states as the previous step.

ST4 . . . As a initial setting, the input to the brake pedal 22 is released after having elapsed a predetermined period while being kept inputting to the brake pedal 22. The bleeding mode is now in a state of preparing for activation.

ST5 . . . Furthermore, as the initial setting, an input to the brake pedal 22 is performed. The bleeding mode is still in the state of preparing for activation continuously from ST4.

ST6 . . . Furthermore, as the initial setting, the input to the brake pedal 22 is released. The bleeding mode is still in the state of preparing for activation continuously from ST5 and, when ST6 is ended, the bleeding mode is activated.

ST7 . . . An input to the front brake (brake lever 21) is performed. Consequently, since a valve I (main path electromagnetic valve 43), a valve II (power unit-side electromagnetic valve 47), and a valve III (simulator-side electromagnetic valve 31) are opened together, so that the bleeding is performed from a bleeding hole h1 of the valve unit 146 (simulator-side bleeding hole 53), a bleeding hole h2 (bypass-side bleeding hole 54), and a bleeding hole h3 of the power unit 46 (power unit side bleeding hole 77) respectively (see FIG. 9).

In the rows of valve I to valve III in FIG. 3, arrows indicate the same states as the previous step.

ST8 . . . When an input to the brake pedal 22 is performed, the opening and closing states of the valves are switched. Then, an input to the brake lever 21 is performed, and a state in which the fluid pressure acts on the stroke simulator 28 is maintained (see FIG. 10).

ST9 . . . When an input to the brake pedal 22 is performed, the opening and closing states of the valves are switched. Therefore, the input to the brake lever 21 is released and then a state in which the bleeding hole 59 of the brake caliper 56 is opened is maintained (see FIG. 11).

ST10 . . . When an input to the brake pedal 22 is performed, the power unit 46 is operated for a certain period of time automatically, and the fluid pressure in the cylinder body 73 is increased (see FIG. 12).

ST11 . . . When the operation of the power unit 46 is stopped, the opening and closing states of the valves are switched. Therefore, the bleeding from the bleeding hole 59 of the brake caliper 56 is performed (see FIG. 13).

ST12 . . . When an input to the brake pedal 22 is performed, the opening and closing states of the valves are switched. In addition, the power unit 46 is operated, and the fluid pressure in the cylinder body 73 is lowered (see FIG. 14).

ST13 . . . When an indicator is flashed, the main switch is turned OFF (see FIG. 15).

Also, the check coupler is removed from the predetermined coupler.

As described above, when the bleeding of the front wheel braking device 11 is performed, the fluid pressure in the brake fluid channel is increased by the input to the brake lever 21 of the front wheel braking device 11, and the opening and closing states of the respective electromagnetic valves are switched by the input to the brake pedal 22 of the rear wheel braking device 12. Therefore, the bleeding procedure may be proceeded easily by the operator for performing the bleeding operation by operating the brake lever 21 and the brake pedal 22, and no specific operating member does not have to be operated.

FIG. 4 is a second flowchart showing a flow of the braking system according to the embodiment of the present invention, and a bleeding procedure of the rear wheel braking device 12 will be described below. In the following description, steps are designated by ST. From Step 21 to Step 26 are the same as the bleeding procedure for the front wheel braking device 11, so that the description is omitted.

ST27 . . . An input to the rear brake (brake pedal 22) is performed. Consequently, the valve I (the main path electromagnetic valve 43), the valve II (the power unit-side electromagnetic valve 47), and the valve III (simulator-side electromagnetic valve 31) are all opened, the bleeding is performed from the bleeding hole h1 of the valve unit 146 (simulator-side bleeding hole 53), the bleeding hole h2 (the bypass-side bleeding hole 54), and the bleeding hole h3 of the power unit 46 (power unit side bleeding hole 77), respectively.

ST28 . . . When an input to the front brake (brake lever 21) is performed, the opening and closing states of the valves are switched, and subsequently, an input to the brake pedal 22 is performed, and a state in which the fluid pressure acts on the stroke simulator 28 is maintained.

ST29 ... When an input to the brake lever 21 is performed, the opening and closing states of the valves are switched. Therefore, the input to the brake pedal 22 is released and then a state in which the bleeding hole 99 of the brake caliper 92 is opened is maintained.

ST30 ... When an input to the brake lever 21 is performed, the power unit 46 is operated for a certain period of time automatically, and the fluid pressure in the cylinder body 73 is increased.

ST31 ... When the operation of the power unit 46 is stopped, the opening and closing states of the valves are switched. Therefore, the bleeding from the bleeding hole 99 of the brake caliper 92 is performed.

ST32 ... When an input to the brake lever 21 is performed, the opening and closing states of the valves are switched. In addition, the power unit 46 is operated, and the fluid pressure in the cylinder body 73 is lowered.

ST33 ... When the indicator is flashed, the main switch is turned OFF. Also, the check coupler is removed from the predetermined coupler.

As described above, when the bleeding of the rear wheel braking device 12 is performed as well, the fluid pressure in the brake fluid channel is increased by the input to the brake pedal 22 of the rear wheel braking device 12, and the opening and closing states of the respective electromagnetic valves are switched by the input to the brake lever 21 of the front wheel braking device 11. Therefore, the bleeding procedure may be proceeded easily by the operator for performing the bleeding operation by operating the brake lever 21 and the brake pedal 22, and no specific operating member does not have to be operated.

Figure 5:
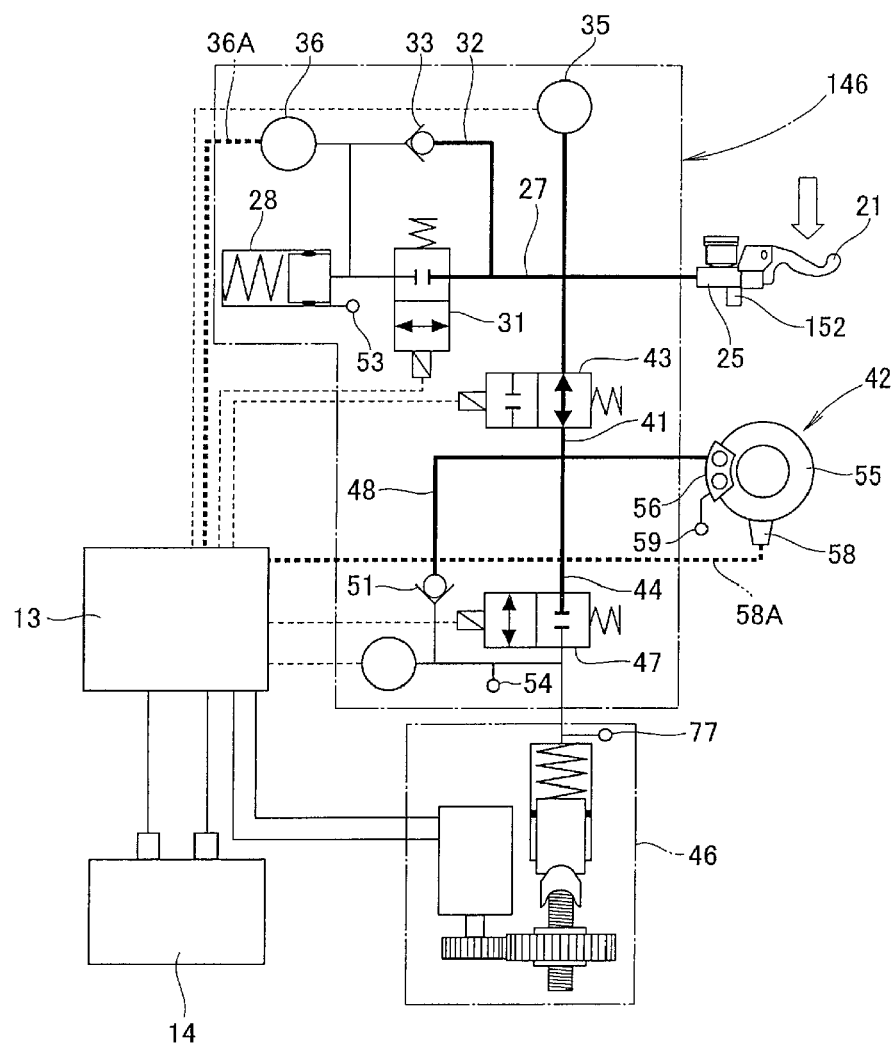
FIG. 5 is a first operational drawing showing an operation of the braking system according to the embodiment of the present invention.

FIG. 5 is a first operational drawing (normal mode) showing an operation of the braking system according to the embodiment of the present invention, and is the normal mode, that is, a mode in which the amounts of operation of the brake lever and the brake pedal are electrically detected and the front wheel and the rear wheel are applied with brakes by the front wheel disk braking device and the rear wheel disk braking device depending on the detected amounts of operation. In the following description, in the braking system, a portion where the brake fluid pressure is generated, a portion where a signal flows, and a portion in which the electricity is distributed are indicated by thick lines. Since the operations of the front wheel braking device 11 and the rear wheel braking device 12 are almost the same, a description is mainly given about the front wheel braking device 11 below.

In a case where an ignition switch of the vehicle is OFF (for example, when the vehicle is stopped or when the vehicle is transferred by the operator), or when the ignition switch of the vehicle is ON and the wheel velocity of the front wheel detected by the front wheel velocity sensor 58 is zero or smaller than a predetermined value (that is, when it is determined by the ECU 13 that the vehicle is stopped), the simulator-side electromagnetic valve 31 is closed, the main path electromagnetic valve 43 is opened, and the power unit-side electromagnetic valve 47 is closed. Therefore, by operating the brake lever 21 as indicated by a hollow arrow, the fluid pressure is generated by the front wheel master cylinder 25, and the fluid pressure is transmitted to paths indicated by thick lines in the drawing. The lead lines 36A and 58A indicated by the thick lines are those when the ignition switch is ON.

The "the wheel velocity of the front wheel detected by the front wheel velocity sensor 58 is zero or smaller than a predetermined value" may be "the velocity of the vehicle body obtained by the front wheel velocity sensor 58 and the rear wheel velocity sensor 86 (that is, the vehicle velocity) is zero or smaller than a predetermined value (threshold value of the velocity of the vehicle body)".

The fluid pressure generated by the front wheel master cylinder 25 is transmitted to the brake caliper 56 of the front wheel disk braking device 42, and the brake disk 55 is applied with brakes by the brake caliper 56, so that the front wheel is applied with brakes. In other words, the front wheel may be applied with brakes manually.

In this manner, the reason why the fluid pressure is generated manually when the vehicle is determined to be stopped in the bi-wire system to apply brakes on the front wheel with this fluid pressure is that if the front wheel is applied with brakes by generating the fluid pressure by the power unit, described later, a load is applied to the power unit, and the power consumption is increased, and hence alleviation of the load and reduction of the power consumption are desired.

Figure 6:
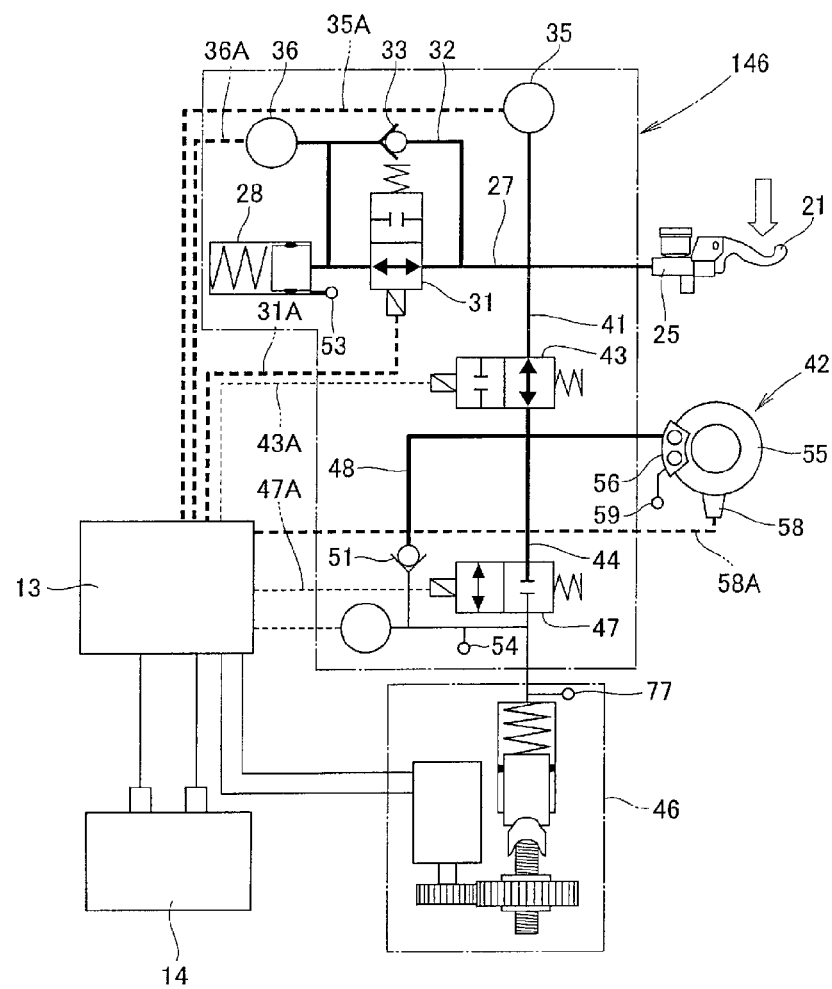
FIG. 6 is a second operational drawing showing an operation of the braking system according to the embodiment of the present invention.

FIG. 6 is a second operational drawing (normal mode) showing an operation of the braking system according to the embodiment of the present invention.

When the vehicle starts to travel and the wheel velocity of the front wheel detected by the front wheel velocity sensor 58 reaches the predetermined value or higher, since a front wheel velocity signal is outputted to the ECU 13 from the front wheel velocity sensor 58 via the lead line 58A, the ECU 13 sends a valve open signal to the simulator-side electromagnetic valve 31 on the basis of the front wheel velocity signal. Consequently, the simulator-side electromagnetic valve 31 is opened, and the front wheel master cylinder 25 and the stroke simulator 28 come into communication with each other.

"When the wheel velocity of the front wheel detected by the front wheel velocity sensor 58 reaches the predetermined value or higher, since a front wheel velocity signal is outputted to the ECU 13 from the front wheel velocity sensor 58 via the lead line 58A, the ECU 13 sends a valve open signal to the simulator-side electromagnetic valve 31 on the basis of the front wheel velocity signal" described above may be "When the velocity of the vehicle body detected by the front wheel velocity sensor 58 and the rear wheel velocity sensor 86 reaches the predetermined value (the threshold value of the velocity of the vehicle body) or higher, the ECU 13 sends the valve open signal to the simulator-side electromagnetic valve 31 on the basis of a vehicle velocity signal".

In this manner, when the velocity of the vehicle body reaches the predetermined value or higher, the simulator-side electromagnetic valve 31 is opened, and hence the second pressure sensor 36 is hardly be affected by pressure fluctuations caused by the braking operation when the vehicle is stopped.

By operating the brake lever 21 in this state as shown in the hollow arrow, the fluid pressure is generated by the front wheel master cylinder 25, and this fluid pressure is transmitted to the brake caliper 56 of the front wheel disk braking device 42 so that the front wheel is applied with brakes. The fluid pressure in the stroke simulator 28 is detected by the second pressure sensor 36, and the pressure signal is outputted to the ECU 13 via the lead line 36A.

Figure 7:
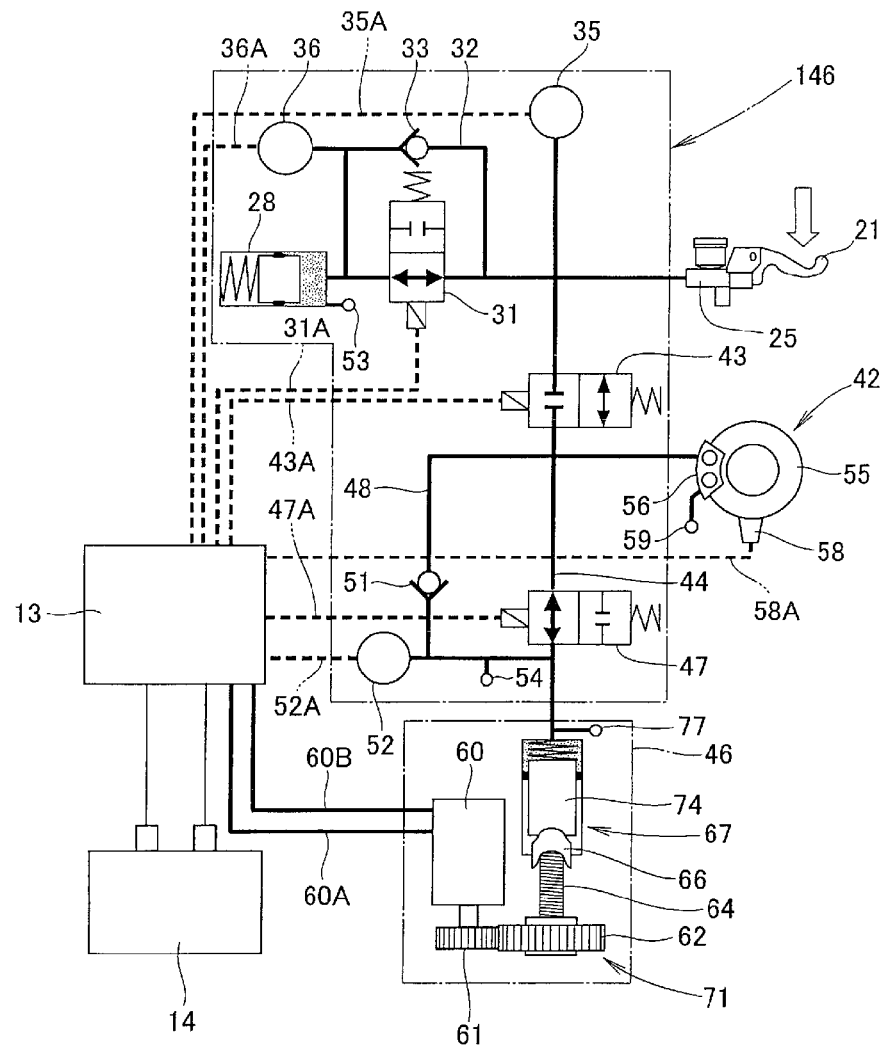
FIG. 7 is a third operational drawing showing an operation of the braking system according to the embodiment of the present invention.

FIG. 7 is a third operational drawing (normal mode) showing an operation of the braking system according to the embodiment of the present invention.

When the brake lever 21 is operated, and the fluid pressure detected by the second pressure sensor 36 reaches the predetermined value and higher in FIG. 6, the stroke simulator 28 is activated, a valve close signal is sent from the ECU 13 to the main path electromagnetic valve 43 on the basis of the pressure signal from the second pressure sensor 36 and the valve open signal is sent to the power unit-side electromagnetic valve 47 in FIG. 7.

Consequently, the main path electromagnetic valve 43 is closed and the front wheel master cylinder 25 and the front wheel disk braking device 42 are not connected any longer, while the power unit-side electromagnetic valve 47 is opened and the power unit 46 and the front wheel disk braking device 42 are connected.

In addition, the electricity is distributed to the electric motor 60 from a motor drive unit (not shown) provided in the ECU 13. Consequently, the electric motor 60 starts operation and the power piston 74 is moved, so that the fluid pressure is generated in the power cylinder device 67. This fluid pressure is transmitted to the brake caliper 56 of the front wheel disk braking device 42, and the front wheel is applied with brakes. In other words, the application of brakes on the front wheel by the bi-wire is achieved. The stroke simulator 28 is still in operation at this time.

When the front wheel is applied with brakes, the application of brakes on the rear wheel by the rear wheel braking device 12 shown in FIG. 1 is performed in the same manner as the operation of the front wheel braking device 11 described above automatically in conjunction with the application of breaks on the front wheel on the basis of an input pressure of the front wheel braking device 11, that is, the brake fluid pressure detected by the second pressure sensor 36.

When the rear wheel is applied with brakes, the application of brakes on the front wheel by the front wheel braking device 11 is performed automatically in conjunction with the application of brakes on the rear wheel on the basis of an input pressure of the rear wheel braking device 12, that is, the brake fluid pressure detected by the second pressure sensor 36 on the rear wheel braking device 12 side in contrast to the description given above.

Figure 8:
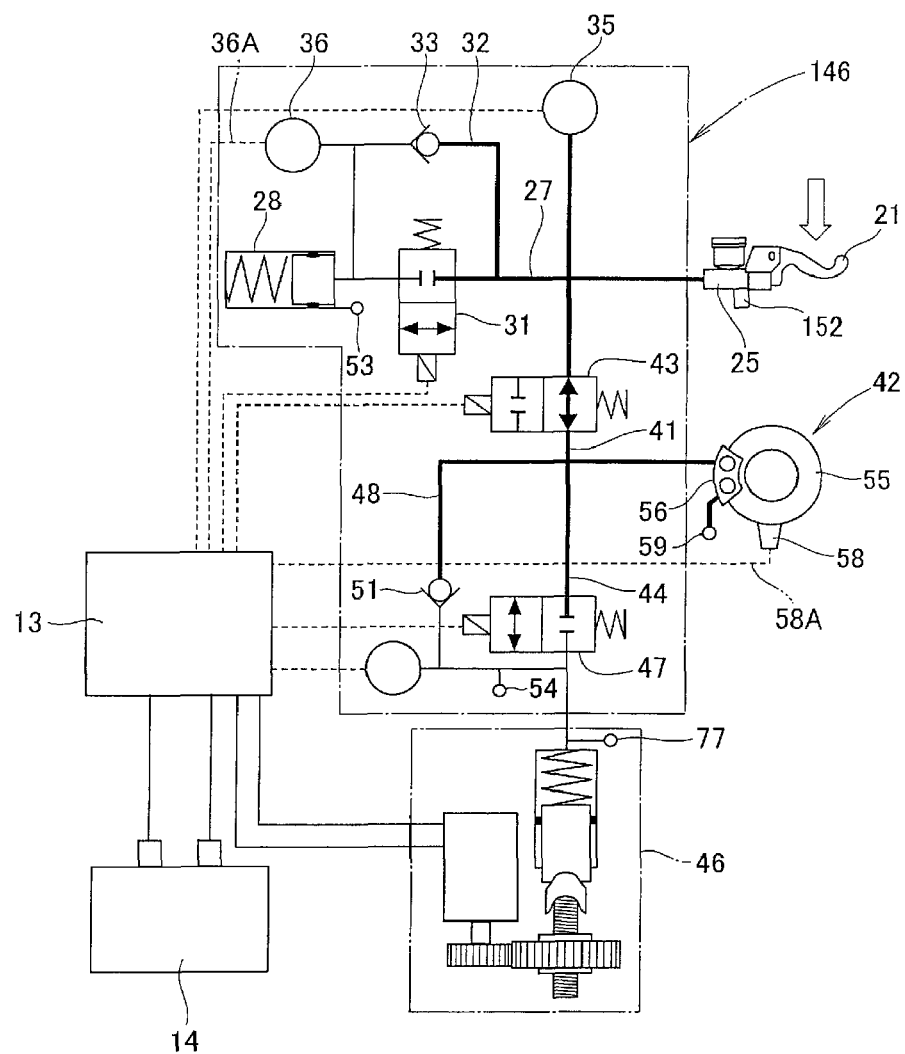
FIG. 8 is a fourth operational drawing showing an operation of the braking system according to the embodiment of the present invention.

FIG. 8 is a fourth operational drawing (bleeding mode) showing an operation of the braking system according to the embodiment of the present invention and showing Step 1 in the bleeding procedure of the front wheel braking device shown in FIG. 3.

The main path electromagnetic valve 43 is opened and the power unit-side electromagnetic valve 47 is closed, and then the simulator-side electromagnetic valve 31 is closed.

In this state, as shown by a hollow arrow, the input to the brake lever 21 is performed by a plurality of times to increase the fluid pressure in the brake fluid channel, the bleeder screw for closing the bleeding hole 59 of the brake caliper 56 is loosened to perform the bleeding from the bleeding hole 59.

Figure 9:
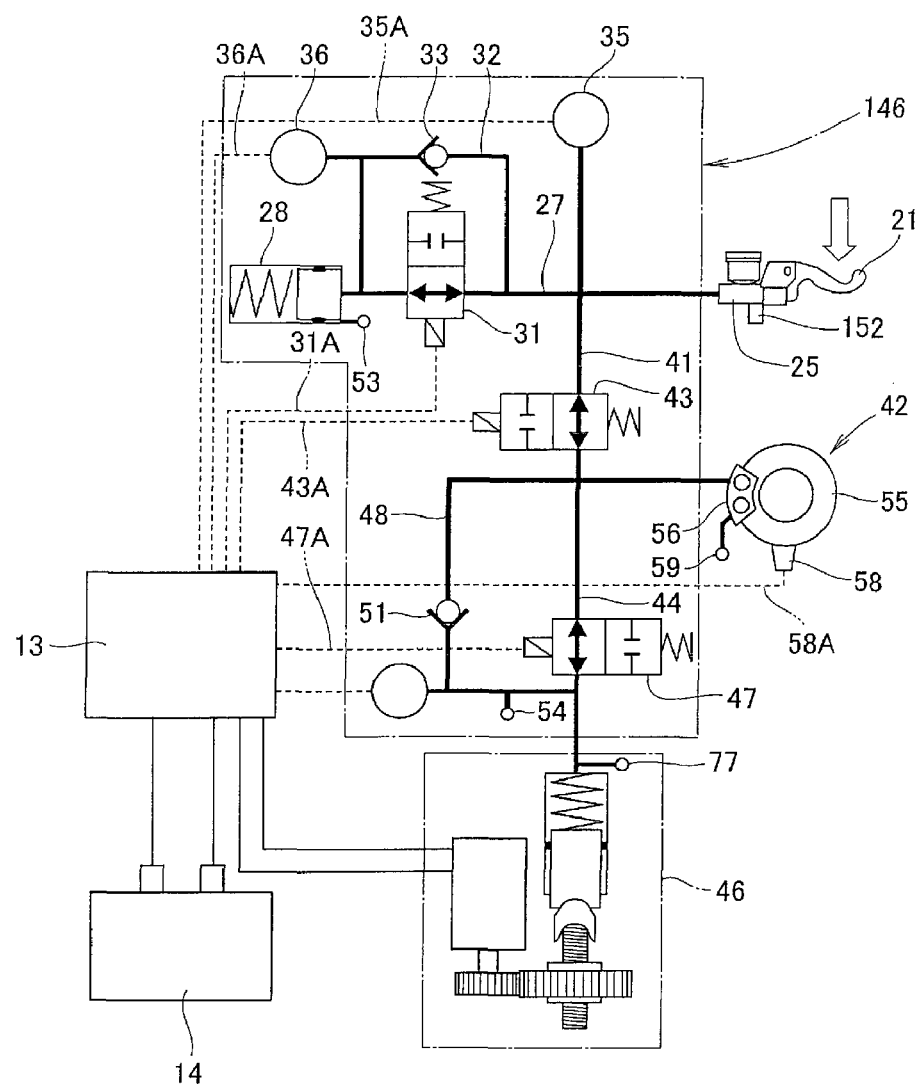
FIG. 9 is a fifth operational drawing showing an operation of the braking system according to the embodiment of the present invention.

FIG. 9 is a fifth operational drawing (bleeding mode) showing an operation of the braking system according to the embodiment of the present invention and showing Step 7 in the bleeding procedure of the front wheel braking device shown in FIG. 3. In the description given below, the operation of the bleeding mode of the front wheel braking device is shown, and the bleeding mode of the rear wheel braking device is omitted because they are almost the same.

As shown by a hollow arrow, when the input to the brake lever 21 as the front brake is performed, the main path electromagnetic valve 43, the power unit-side electromagnetic valve 47, and the simulator-side electromagnetic valve 31 are all opened.

In this state, the bleeder screws which close the simulator-side bleeding hole 53 and the bypass-side bleeding hole 54 of the valve unit 146 (see FIG. 1) are loosened to bleed from the simulator-side bleeding hole 53 and the bypass-side bleeding hole 54, then the bleeder screw that closes the power unit side bleeding hole 77 of the power unit 46 is loosened to bleed from the power unit-side bleeding hole 77. Before loosening the respective bleeder screws, the input to the brake lever 21 is performed by a plurality of times as indicated by the hollow arrow to increase the fluid pressure in the brake fluid channel.

Figure 10:
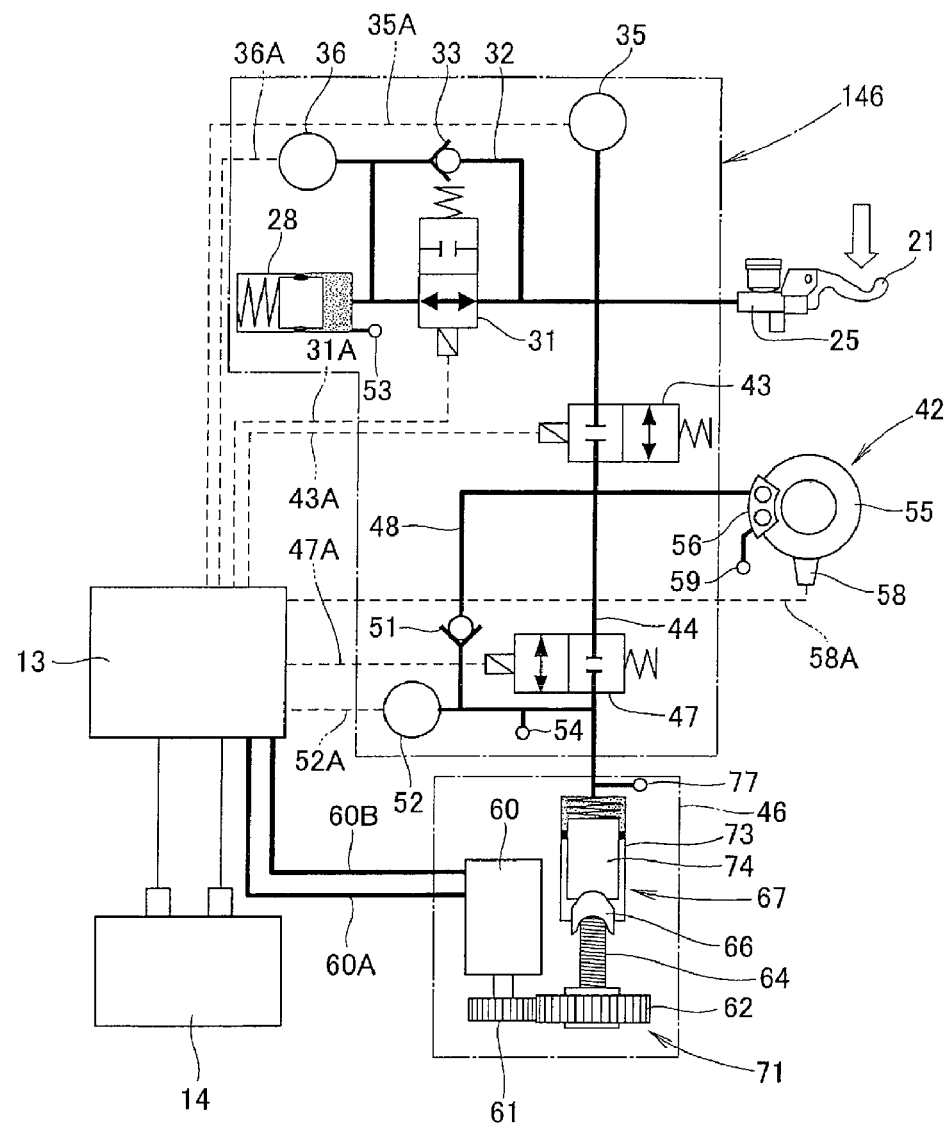
FIG. 10 is a sixth operational drawing showing an operation of the braking system according to the embodiment of the present invention.

FIG. 10 is a sixth operational drawing (bleeding mode) showing an operation of the braking system according to the embodiment of the present invention and showing Step 8 in the bleeding procedure of the front wheel braking device shown in FIG. 3. When the input to the brake pedal 22 (see FIG. 1) as the rear brake is performed, the main path electromagnetic valve 43 is closed, and the power unit-side electromagnetic valve 47 is closed, and then the simulator-side electromagnetic valve 31 is opened.

Subsequently, as shown by a hollow arrow, the input to the brake lever 21 is performed and a state in which the fluid pressure acts on the stroke simulator 28 is maintained.

Figure 11:
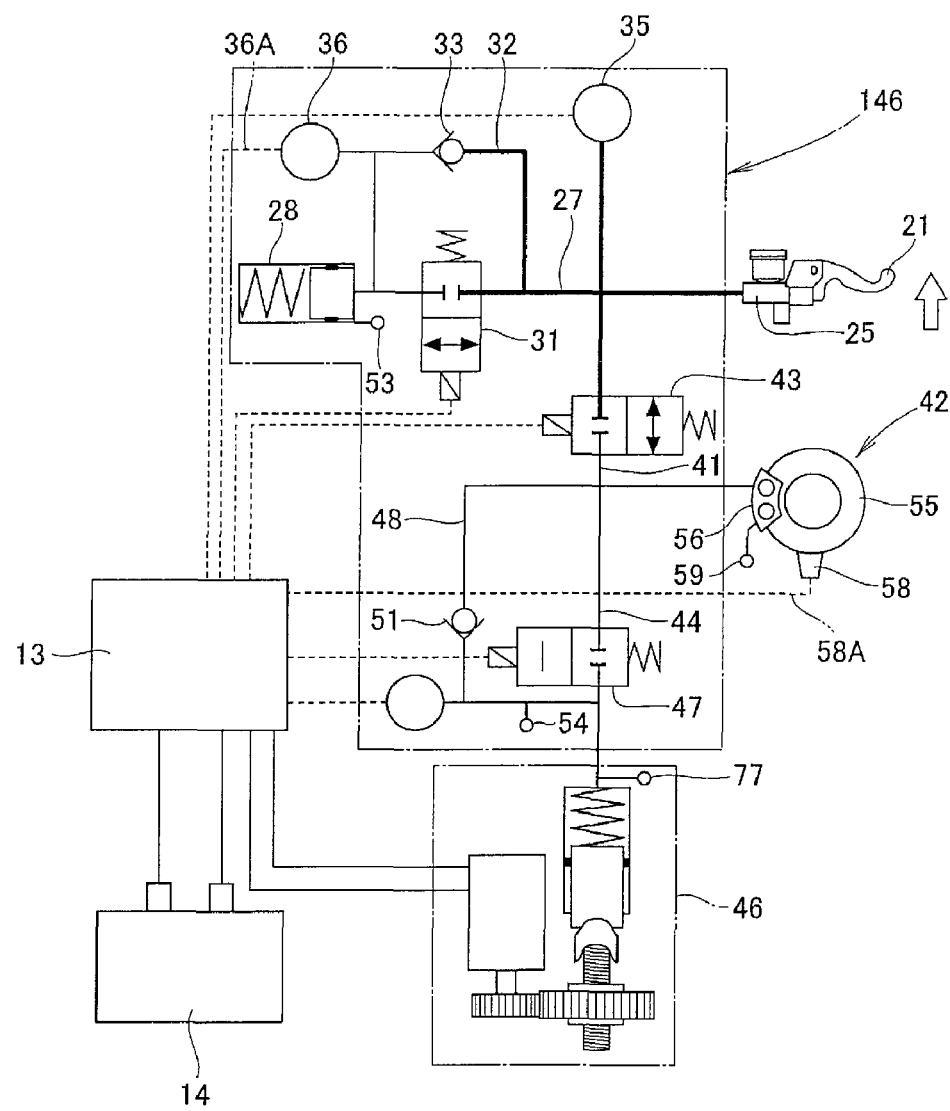
FIG. 11 is a seventh operational drawing showing an operation of the braking system according to the embodiment of the present invention.

FIG. 11 is a seventh operational drawing (bleeding mode) showing an operation of the braking system according to the embodiment of the present invention and showing Step 9 in the bleeding procedure of the front wheel braking device shown in FIG. 3.

When the input to the brake pedal 22 (see FIG. 1) is performed, the main path electromagnetic valve 43, the power unit-side electromagnetic valve 47, and the simulator-side electromagnetic valve 31 are all closed.

Subsequently, as shown by a hollow arrow, the input to the brake lever 21 is released, and then a state in which the bleeder screw which closes the bleeding hole 59 of the brake caliper 56 is loosened is maintained.

Figure 12:
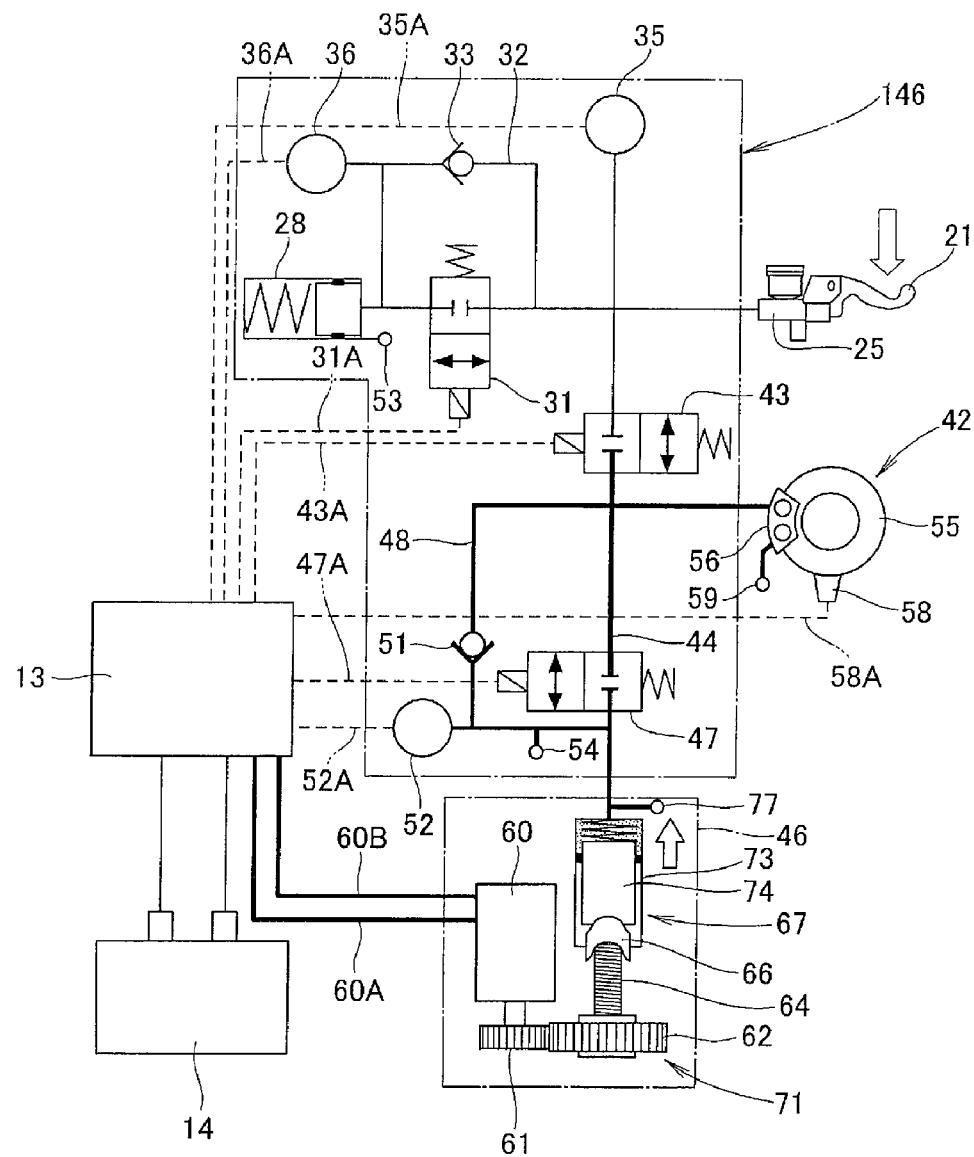
FIG. 12 is an eighth operational drawing showing an operation of the braking system according to the embodiment of the present invention.

FIG. 12 is an eighth operational drawing (bleeding mode) showing an operation of the braking system according to the embodiment of the present invention and showing Step 10 in the bleeding procedure of the front wheel braking device shown in FIG. 3.

In the same manner as in Step 9, the main path electromagnetic valve 43, the power unit-side electromagnetic valve 47, and the simulator-side electromagnetic valve 31 are all closed.

When the input to the brake pedal 22 (see FIG. 1) is performed, the electric motor 60 of the power unit 46 is operated for a certain period of time, the power piston 74 is moved as indicated by a hollow arrow, and the fluid pressure in the cylinder body 73 is increased.

Figure 13:
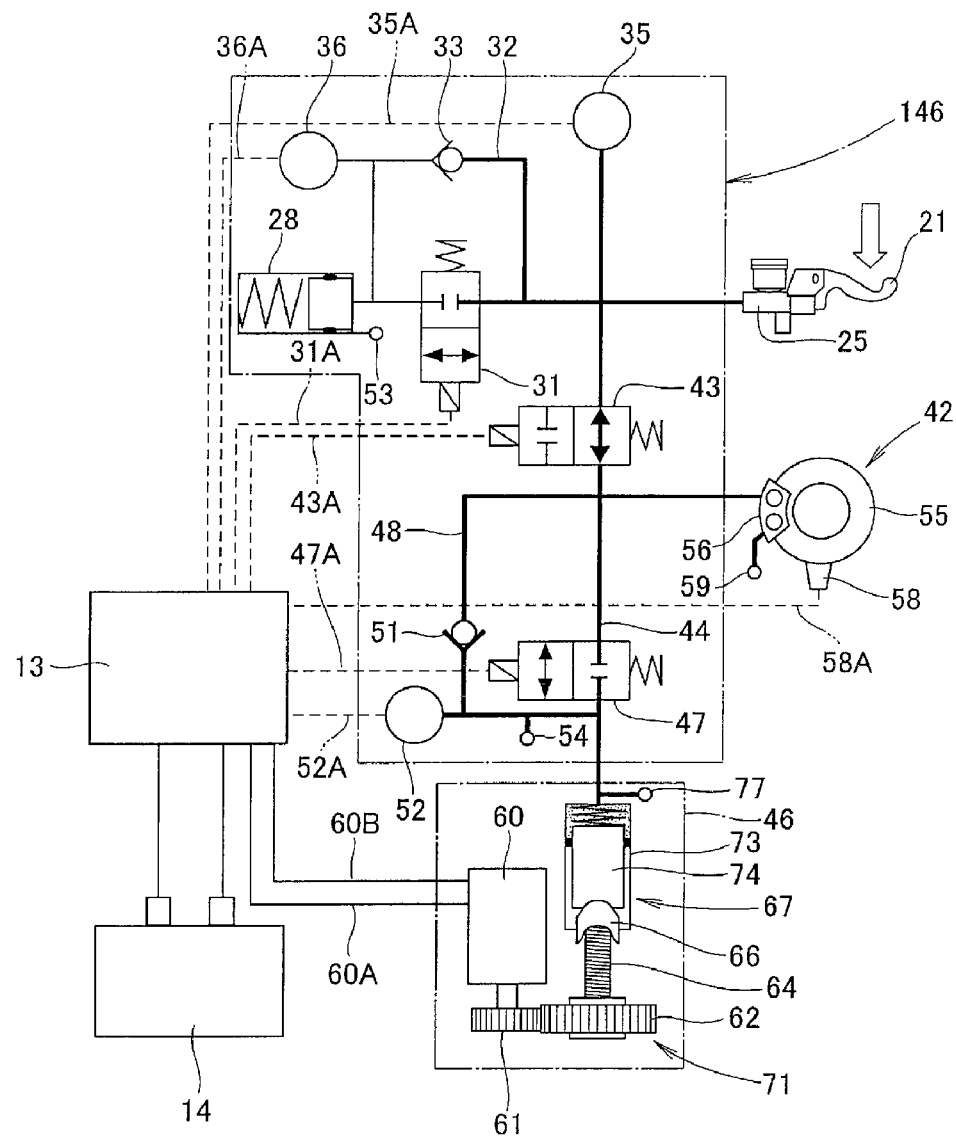
FIG. 13 is a ninth operational drawing showing an operation of the braking system according to the embodiment of the present invention.

FIG. 13 is a ninth operational drawing (bleeding mode) showing an operation of the braking system according to the embodiment of the present invention and showing Step 11 in the bleeding procedure of the front wheel braking device shown in FIG. 3.

When the operation of the electric motor 60 of the power unit 46 is stopped, the main path electromagnetic valve 43 is opened, the power unit-side electromagnetic valve 47 is closed, and the simulator-side electromagnetic valve 31 is closed.

In this state, as shown by a hollow arrow, the input to the brake lever 21 is performed by a plurality of times to increase the fluid pressure in the brake fluid channel, the bleeder screw for closing the bleeding hole 59 of the brake caliper 56 is loosened to perform bleeding from the bleeding hole 59.

Figure 14:
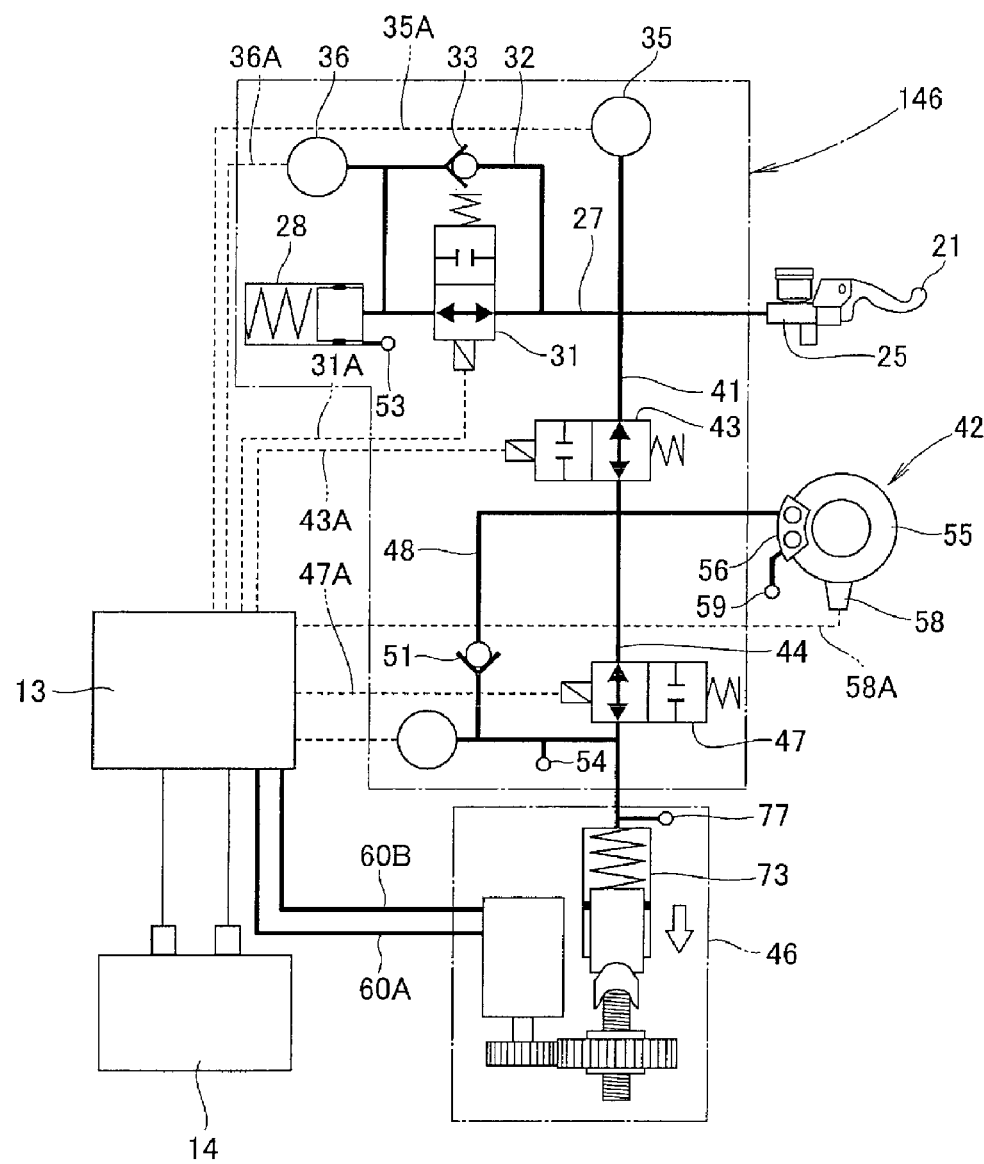
FIG. 14 is a tenth operational drawing showing an operation of the braking system according to the embodiment of the present invention.

FIG. 14 is a tenth operational drawing (bleeding mode) showing an operation of the braking system according to the embodiment of the present invention and showing Step 12 in the bleeding procedure of the front wheel braking device shown in FIG. 3.

When the input to the brake pedal 22 (see FIG. 1) is performed, the main path electromagnetic valve 43, the power unit-side electromagnetic valve 47, and the simulator-side electromagnetic valve 31 are all opened.

At this time, the electric motor 60 of the power unit 46 is operated, the power piston 74 is moved as indicated by a hollow arrow, and the fluid pressure in the cylinder body 73 is lowered.

Figure 15:
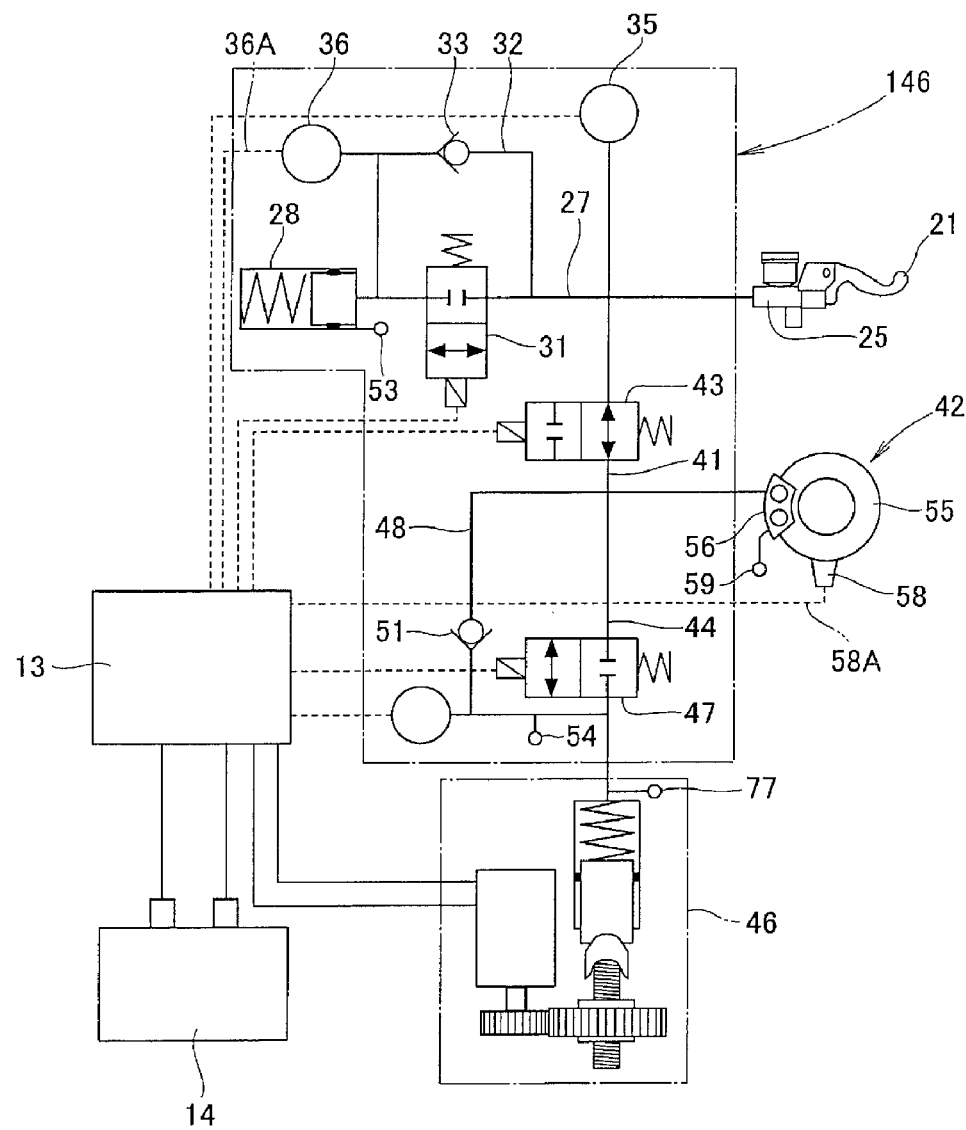
FIG. 15 is an eleventh operational drawing showing an operation of the braking system according to the embodiment of the present invention.

FIG. 15 is an eleventh operational drawing (bleeding mode) showing an operation of the braking system according to the embodiment of the present invention and showing Step 13 in the bleeding procedure of the front wheel braking device shown in FIG. 3.

When the main switch is turned OFF after the indicator is flashed, the main path electromagnetic valve 43 is opened, the power unit-side electromagnetic valve 47 is closed, and the simulator-side electromagnetic valve 31 is closed by the respective compression coil springs.

As shown in FIG. 1 and FIG. 2, in the braking system 10 including the front wheel and rear wheel master cylinders 25 and 82 as master cylinders configured to generate the brake fluid pressure in conjunction with the braking operations of the brake lever 21 and the brake pedal 22 as brake operating units, the front wheel and rear wheel disk braking devices 42 and 84 as wheel braking means configured to provide the braking force to the wheels by the fluid pressure, the brake pipings 41 as the first brake fluid channels configured to connect the front wheel and rear wheel master cylinders 25 and 82 and the front wheel and rear wheel disk braking devices 42 and 84 respectively, the main path electromagnetic valves 43 as the first electromagnetic opening and closing valves provided in the brake pipings 41 for bringing the front wheel and rear wheel master cylinders 25 and 82 and the front wheel and rear wheel disk braking devices 42 and 84 into communication with or out of communication with each other, the power units 46 configured to generate the fluid pressure by the electric motors 60 as the electric actuators, the brake pipings 44 as the second brake fluid channels configured to connect the power units 46 and the front wheel and rear wheel disk braking devices 42 and 84 respectively, the power unit-side electromagnetic valves 47 as the second electromagnetic opening and closing valves provided in the brake pipings 44 for bringing the power units 46 and the front wheel and rear wheel disk braking devices 42 and 84 into communication with or out of communication with each other, and the ECU 13 configured to open and close the main path electromagnetic valves 43 and the power unit-side electromagnetic valves 47, since the ECU 13 includes the bleeding mode setting unit 154 which opens and closes the main path electromagnetic valves 43 and the power unit-side electromagnetic valves 47 to perform the bleeding operation from the brake fluid paths including the brake pipings 41 and the brake pipings 44 and the determining unit 153 configured to determine whether or not to permit the transfer to the bleeding mode, the ECU 13 is able to set the bleeding mode, whereby the main path electromagnetic valves 43 and the power unit-side electromagnetic valves 47 may be opened and closed selectively in such a manner that the electromagnetic valve which is required for the bleeding operation is opened and the electromagnetic valve which is not required for the bleeding operation is closed. Consequently, the complicated operation to open and close the electromagnetic valves for the bleeding operation may be performed automatically, and the bleeding operation is easily achieved.

Also, for example, the ECU 13 is able to open and close the plurality of electromagnetic valves without using a separate computer, so that cost increase may be restrained.

Also, the stroke simulators 28 configured to cause the pseudo reaction force according to the amounts of operation of the brake lever 21 and the brake pedal 22 to act on the brake lever 21 and the brake pedal 22, the brake pipings 27 branched from brake pipings 41 at the position on the front wheel and rear wheel master cylinders 25 and 82 side with respect to the main path electromagnetic valves 43 and connect the brake pipings 41 and the stroke simulators 28 respectively, and the simulator-side electromagnetic valves 31 provided on the brake pipings 27 for bringing the front wheel and rear wheel master cylinders 25 and 82 into communication with and out of communication with the stroke simulators 28 are provided, and the main path electromagnetic valves 43, the power unit-side electromagnetic valves 47, the simulator-side electromagnetic valves 31, the stroke simulators 28, the brake pipings 27, part of the brake pipings 41, and part of the brake pipings 44 constitute the valve units 146 as the electromagnetic opening and closing valve units, and the valve units 146 and the power units 46 each includes the bleeding holes 53, 54 and the bleeding holes 77. Therefore, the bleeding is achieved from a plurality of points, and the bleeding is easily achieved even the brake fluid channels are complicated.

Furthermore, since the determining unit 153 permits the bleeding mode setting unit 154 to transfer to the bleeding mode when the determining unit 153 has sensed the completion of operations of the first permitting means 151 and the second permitting means 152, selection of the bleeding mode only when the bleeding operation is wanted is achieved with the provision of the plurality of the permitting means 151 and 152.

Also, since the first permitting means is the switching means 151 which is able to switch the mode between electricity distribution and non-electricity distribution depending on the presence or absence of the connection, and the second permitting means is the braking operation sensing means 152 configured to sense the braking operations of the brake lever 21 and the brake pedal 22, the bleeding mode is not achieved unless the electric connection is achieved by the switching means 151, and the bleeding mode is not achieved unless a predetermined braking operation is sensed, the probability of transfer to the bleeding mode may be reduced.

As shown in FIG. 3 and FIG. 4, since the bleeding mode setting unit 154 includes a plurality of opening and closing patterns for the first to third electromagnetic opening and closing valves 43, 47, and 31, and the plurality of opening and closing patterns are performed in sequence according to the permitting signals from the determining unit 153, the bleeding operation is achieved quickly, accurately, and easily.

As shown in FIG. 1, FIG. 3, and FIG. 4, since the bleeding mode setting unit 154 includes a control mode which brings the power unit-side electromagnetic valves 47 into the closed state to pressurize with the power units 46, the bleeding is achieved easily by driving the electric motors 60 when releasing air on the power units 46 side.

Also, as shown in FIG. 9, since the electromagnetic opening and closing valve unit 146 (see FIG. 1) is provided with the simulator-side bleeding hole 53 and the bypass-side bleeding hole 54 as the plurality of bleeding holes, and the simulator-side bleeding hole 53 and the bypass-side bleeding hole 54 are provided at least on the front wheel master cylinder 25 side with respect to the main path electromagnetic valve 43 and the power unit 46 side with respect to the main path electromagnetic valve 43, the bleeding from the brake fluid channel on the front wheel master cylinder 25 side and the bleeding from the brake fluid channel on the power unit 46 side with the intermediary of the main path electromagnetic valve 43 are achieved separately from the simulator-side bleeding hole 53 and the bypass-side bleeding hole 54.

In this embodiment, as shown in FIG. 2, the two permitting means (the switching means 151 as the first permitting means and the braking operation sensing means 152 as the second permitting means) are provided. However, the invention is not limited thereto, and two or more of those may be provided.

As shown in FIG. 3 and FIG. 4, the coupler is employed as the switching means as the first permitting means, the invention is not limited thereto, and switching may be achieved by a switch or the like.

The braking system according to the embodiment of the present invention is suitable for motorcycles.

According to a first embodiment of the present invention, a braking system includes a master cylinder configured to generate a brake fluid pressure in conjunction with a braking operation of a brake operating unit; wheel braking means configured to provide a braking force to a wheel by the fluid pressure; a first brake fluid channel configured to connect the master cylinder and the wheel braking means respectively; a first electromagnetic opening and closing valve provided in the first brake fluid channel for bringing the master cylinder into communication with or out of communication with the wheel braking means; a power unit configured to generate the fluid pressure by an electric actuator; a second brake fluid channel configured to connect the power unit and the wheel braking means respectively; a second electromagnetic opening and closing valve provided in the second brake fluid channel for bringing the power unit into communication with or out of communication with the wheel braking means, and an ECU configured to open and close the first electromagnetic opening and closing valve and the second electromagnetic opening and closing valve, characterized in that the ECU includes a bleeding mode setting unit configured to open and close the first electromagnetic opening and closing valve and the second electromagnetic opening and closing valve to perform the bleeding operation from a brake fluid path including the first brake fluid channel and the second brake fluid channel, and a determining unit configured to determine whether or not to permit the transfer to the bleeding mode.

As an operation, when the transfer to the bleeding mode is permitted by the determining unit, the bleeding mode is set by the ECU, and the first electromagnetic opening and closing valve and the second electromagnetic opening and closing valve are selectively opened and closed, then a bleeding channel at a portion of the brake fluid channel to be bled is brought into communication and the bleeding channel at a portion thereof not to be bled is brought out of communication.

According to a second embodiment of the present invention, the braking system includes a stroke simulator configured to cause a pseudo reaction force according to an amount of operation of the brake operating unit to act on the brake operating unit; a third brake fluid channel branched from the first brake fluid channel at a position on the master cylinder side with respect to the first electromagnetic opening and closing valve and connected the first brake fluid channel and the stroke simulator respectively; and a third electromagnetic opening and closing valve provided in the third brake fluid channel for bringing the master cylinder into communication with and out of communication with the stroke simulator, and the first to third electromagnetic opening and closing valves, the stroke simulator, the third brake fluid channel, and part of the first and second brake fluid channels constitute an electromagnetic opening and closing valve unit, and the electromagnetic opening and closing valve unit and the power unit each includes a bleeding hole.

As an operation, the bleeding is achieved from the electromagnetic opening and closing valve unit side and the power unit side, respectively.

According to a third embodiment of the present invention, the determining unit permits the bleeding mode setting unit to transfer to the bleeding mode when the determining unit has sensed the completion of operations of first permitting means and second permitting means.

As an operation, since the transfer to the bleeding mode is not permitted unless the operations of the first permitting means and the second permitting means are completed, erroneous transfer to the bleeding mode is prevented.

According to a fourth embodiment of the present invention, the first permitting means is switching means which is able to switch a mode between electricity distribution and non-electricity distribution depending on the presence or absence of the connection, and the second permitting means is braking operation sensing means configured to sense the braking operation of the brake operating unit.

As an operation, when the electricity is distributed to the bleeding mode circuit by the switching means as the first permitting means and the determining unit receives a predetermined sensing signal from the braking operation sensing means as the second permitting means, it is determined that the operations of the first permitting means and the second permitting means are completed, and the determining unit permits the transfer to the bleeding mode.

In other words, it may be configured not to transfer to the bleeding mode unless the operations of the two permitting means are completed.

According to a fifth embodiment of the present invention, the bleeding mode setting unit includes a plurality of opening and closing patterns for the first to third electromagnetic opening and closing valves, and the plurality of opening and closing patterns are performed in sequence according to permitting signals from the determining unit.

As an operation, by performing the plurality of opening and closing patterns in sequence, the bleeding operation is achieved mechanically, quickly, accurately, and easily.

According to a sixth embodiment of the present invention, the bleeding mode setting unit includes a control mode which brings the second electromagnetic opening and closing valve into a closed state to pressurize with the power unit.

As an operation, the power unit is operated to pressurize so as to increase the fluid pressure in the brake fluid channel.

Subsequently, a bleeder screw which closes the bleeding hole is released, and the bleeding from the bleeding hole is performed. Since it is not necessary to increase the fluid pressure in the brake fluid channel manually, the bleeding operation is facilitated.

According to a seventh embodiment of the present invention, the electromagnetic opening and closing valve unit includes a plurality of the bleeding holes, and the bleeding holes are provided respectively at least on the master cylinder side with respect to the first electromagnetic opening and closing valve and the power unit side with respect to the first electromagnetic opening and closing valve.

As an operation, when the bleeding holes are provided respectively on the master cylinder side with respect to the first electromagnetic opening and closing valve and the power unit side with respect to the first electromagnetic opening and closing valve to perform the bleeding, the bleeding from the brake fluid channel on the master cylinder side and the bleeding from the brake fluid channel on the power unit side with the intermediary of the first electromagnetic opening and closing valve are achieved separately from the respective bleeding holes thereof.

According to the first embodiment of the present invention, since the ECU includes the bleeding mode setting unit configured to open and close the first electromagnetic opening and closing valve and the second electromagnetic opening and closing valve to perform the bleeding operation from the brake fluid path including the first brake fluid channel and the second brake fluid channel, and the determining unit configured to determine whether or not to permit the transfer to the bleeding mode, the ECU is able to set the bleeding mode. Therefore, the first electromagnetic opening and closing valve and the second electromagnetic opening and closing valve may be opened and closed selectively in such a manner that the electromagnetic valve which is required for the bleeding is opened and the electromagnetic valve which is not required for the bleeding is closed. Consequently, the complicated operation to open and close the electromagnetic valves for the bleeding operation may be performed automatically, and the bleeding operation is easily achieved.

Also, for example, the ECU is able to open and close the plurality of electromagnetic opening and closing valves without using a separate computer, so that cost increase may be restrained.

The second embodiment of the present invention includes the electromagnetic opening and closing valve unit including the stroke simulator configured to cause the pseudo reaction force according to the amount of operation of the brake operating unit to act on the brake operating unit, the third brake fluid channel branched from the first brake fluid channel at the position on the master cylinder side with respect to the first electromagnetic opening and closing valve and connected the first brake fluid channel and the stroke simulator respectively, the third electromagnetic opening and closing valve provided in the third brake fluid channel for bringing the master cylinder into communication with and out of communication with the stroke simulator, and the first to third electromagnetic opening and closing valves, the stroke simulator, the third brake fluid channel, and part of the first and second brake fluid channels, and the electromagnetic opening and closing valve unit and the power unit each includes the bleeding hole. Therefore, the bleeding is achieved from a plurality of points, and hence the bleeding is performed easily even when the brake fluid channel is complicated.

The third embodiment of the present invention is characterized in that the determining unit permits the bleeding mode setting unit to transfer to the bleeding mode when the determining unit has sensed the completion of operations of first permitting means and second permitting means. Therefore, the bleeding mode can be selected only when the bleeding operation is needed by providing the plurality of permitting means.

Also, according to the fourth embodiment of the present invention, since the first permitting means is the switching means which is able to switch the mode between electricity distribution and non-electricity distribution depending on the presence or absence of the connection, and the second permitting means is the braking operation sensing means which senses the predetermined braking operation of the brake operating unit, the bleeding mode is not achieved unless the electric connection is achieved by the first permitting means, and the bleeding mode is not achieved unless the predetermined braking operation is sensed, the probability of transfer to the bleeding mode erroneously may be reduced.

According to the fifth embodiment of the present invention, since the bleeding mode setting unit includes the plurality of opening and closing patterns for the first to third electromagnetic opening and closing valves, and the plurality of opening and closing patterns are performed in sequence according to the permitting signals from the determining unit, the bleeding operation is achieved quickly, accurately, and easily by performing the bleeding with the plurality of opening and closing patterns.

According to the sixth embodiment of the present invention, since the bleeding mode setting unit includes the control mode which brings the second electromagnetic opening and closing valve into the closed state to pressurize with the power unit, the bleeding is easily performed by driving the actuator when bleeding is performed on the power unit side.

According to the seventh embodiment of the present invention, since the electromagnetic opening and closing valve unit includes the plurality of bleeding holes, and the bleeding holes are provided respectively at least on the master cylinder side with respect to the first electromagnetic opening and closing valve and the power unit side with respect to the first electromagnetic opening and closing valve, the bleeding from the brake fluid channel on the master cylinder side and the bleeding from the brake fluid channel on the power unit side with the intermediary of the first electromagnetic opening and closing valve are achieved separately from the respective bleeding holes.

Obviously, numerous modifications and variations of the present invention are possible in light of the above teachings. It is therefore to be understood that within the scope of the appended claims, the invention may be practiced otherwise than as specifically described herein.

The invention claimed is:

1. A braking system comprising:
    a wheel brake configured to provide a braking force to a wheel according to a fluid pressure, the fluid pressure comprising a first fluid pressure and a second fluid pressure;
    a master cylinder operatively connected to a brake operating unit and configured to generate the first fluid pressure in conjunction with a braking operation of the brake operating unit;
    a first brake fluid channel connecting the master cylinder and the wheel brake;
    a first electromagnetic opening and closing valve provided to the first brake fluid channel to communicate or block the first fluid pressure from the master cylinder to the wheel brake;
    a power unit configured to generate the second fluid pressure by an electric actuator;
    a second brake fluid channel connecting the power unit and the wheel brake;
    a second electromagnetic opening and closing valve provided to the second brake fluid channel to communicate or block the second fluid pressure from the power unit to the wheel brake; and
    an ECU configured to control the first electromagnetic opening and closing valve and the second electromagnetic opening and closing valve and comprising;
        a bleeding mode setting unit configured to set a bleeding mode in which each of the first electromagnetic opening and closing valve and the second electromagnetic opening and closing valve is opened and closed in order to perform an air-bleeding from each of the first brake fluid channel and the second brake fluid channel; and
        a determining unit configured to determine whether or not the bleeding mode setting unit is allowed to set the bleeding mode,
        wherein the bleeding mode comprises a control mode in which the second electromagnetic opening and closing valve is closed and the power unit generates the second fluid pressure.

2. The braking system according to claim 1, further comprising:

a stroke simulator configured to generate a third fluid pressure for a pseudo reaction force according to an amount of the operation of the brake operating unit;

a third brake fluid channel connecting the stroke simulator and the first brake fluid channel positioned between the master cylinder and the first electromagnetic opening and closing valve; and a third electromagnetic opening and closing valve provided to the third brake fluid channel to communicate or block the third fluid pressure from the stroke simulator to the master cylinder, wherein the first to third electromagnetic opening and closing valves, the stroke simulator, the third brake fluid channel, and each part of the first and second brake fluid channels constitute an electromagnetic opening and closing valve unit, the electromagnetic opening and closing valve unit having at least one bleeding hole, and wherein the power unit has another bleeding hole.

3. The braking system according to claim 2, wherein the bleeding mode comprises a plurality of opening and closing patterns in an operation of the first to third electromagnetic opening and closing valves in which the plurality of opening and closing patterns are performed in sequence according to permitting signals from the determining unit.

4. The braking system according to claim 3, wherein the at least one bleeding hole of the electromagnetic opening and closing valve unit comprises at least a first bleeding hole provided on a side of the master cylinder with respect to the first electromagnetic opening and closing valve and a second bleeding hole provided on a side of the power unit with respect to the first electromagnetic opening and closing valve.

5. The braking system according to claim 2, wherein the at least one bleeding hole of the electromagnetic opening and closing valve unit comprises at least a first bleeding hole provided on a side of the master cylinder with respect to the first electromagnetic opening and closing valve and a second bleeding hole provided on a side of the power unit with respect to the first electromagnetic opening and closing valve.

6. The braking system according to claim 2, further comprising a first permitter associated with a first predetermined operation and a second permitter associated with a second predetermined operation, wherein the determining unit is configured to detect a completion of the first and second predetermined operations of the first and second permitters so that the determining unit allows the bleeding mode setting unit to set the bleeding mode when detecting the completion of the predetermined operations.

7. The braking system according to claim 2, wherein the at least one bleeding hole of the electromagnetic opening and closing valve unit comprises at least a first bleeding hole provided on a side of the master cylinder with respect to the first electromagnetic opening and closing valve and a second bleeding hole provided on a side of the power unit with respect to the first electromagnetic opening and closing valve.

8. The braking system according to claim 1, further comprising a first permitter associated with a first predetermined operation and a second permitter associated with a second predetermined operation, wherein the determining unit is configured to detect a completion of the first and second predetermined operations of the first and second permitters so that the determining unit allows the bleeding mode setting unit to set the bleeding mode when detecting the completion of the first and second predetermined operations.

9. The braking system according to claim 8, wherein the first permitter comprises a switching unit configured to connect and disconnect electricity distribution, and wherein the second permitter comprises a braking operation sensor unit configured to detect the braking operation of the brake operating unit.

10. The braking system according to claim 9, wherein the bleeding mode comprises a plurality of opening and closing patterns in an operation of the first to third electromagnetic opening and closing valves in which the plurality of opening and closing patterns are performed in sequence according to permitting signals from the determining unit.

11. The braking system according to claim 9, further comprising:

a stroke simulator configured to generate a third fluid pressure for a pseudo reaction force according to an amount of the operation of the brake operating unit;

a third brake fluid channel connecting the stroke simulator and the first brake fluid channel positioned between the master cylinder and the first electromagnetic opening and closing valve; and a third electromagnetic opening and closing valve provided to the third brake fluid channel to communicate or block the third fluid pressure from the stroke simulator to the master cylinder, wherein the first to third electromagnetic opening and closing valves, the stroke simulator, the third brake fluid channel, and each part of the first and second brake fluid channels constitute an electromagnetic opening and closing valve unit, the electromagnetic opening and closing valve unit having at least one bleeding hole, the at least one bleeding hole comprising at least a first bleeding hole provided on a side of the master cylinder with respect to the first electromagnetic opening and closing valve and a second bleeding hole provided on a side of the power unit with respect to the first electromagnetic opening and closing valve, and wherein the power unit has another bleeding hole.

12. The braking system according to claim 8, wherein the bleeding mode comprises a plurality of opening and closing patterns in an operation of the first to third electromagnetic opening and closing valves in which the plurality of opening and closing patterns are performed in sequence according to permitting signals from the determining unit.

13. The braking system according to claim 8, further comprising:

a stroke simulator configured to generate a third fluid pressure for a pseudo reaction force according to an amount of the operation of the brake operating unit;

a third brake fluid channel connecting the stroke simulator and the first brake fluid channel positioned between the master cylinder and the first electromagnetic opening and closing valve; and a third electromagnetic opening and closing valve provided to the third brake fluid channel to communicate or block the third fluid pressure from the stroke simulator to the master cylinder, wherein the first to third electromagnetic opening and closing valves, the stroke simulator, the third brake fluid channel, and each part of the first and second brake fluid channels constitute an electromagnetic opening and closing valve unit, the electromagnetic opening and closing valve unit having at least one bleeding hole, the at least one bleeding hole comprising at least a first bleeding hole provided on a side of the master cylinder with respect to the first electromagnetic opening and closing valve and a second bleeding hole provided on a side of the power unit with respect to the first electromagnetic opening and closing valve, and wherein the power unit has another bleeding hole.

14. The braking system according to claim 1, further comprising:
- a stroke simulator configured to generate a third fluid pressure for a pseudo reaction force according to an amount of the operation of the brake operating unit;
- a third brake fluid channel connecting the stroke simulator and the first brake fluid channel positioned between the master cylinder and the first electromagnetic opening and closing valve; and
- a third electromagnetic opening and closing valve provided to the third brake fluid channel to communicate or block the third fluid pressure from the stroke simulator to the master cylinder, wherein the first to third electromagnetic opening and closing valves, the stroke simulator, the third brake fluid channel, and each part of the first and second brake fluid channels constitute an electromagnetic opening and closing valve unit, the electromagnetic opening and closing valve unit having at least one bleeding hole, the at least one bleeding hole comprising at least a first bleeding hole provided on a side of the master cylinder with respect to the first electromagnetic opening and closing valve and a second bleeding hole provided on a side of the power unit with respect to the first electromagnetic opening and closing valve, and wherein the power unit has another bleeding hole.

* * * * *